(12) United States Patent
Smith

(10) Patent No.: US 10,518,186 B2
(45) Date of Patent: Dec. 31, 2019

(54) KITE FLYING METHOD, ASSEMBLY AND DEVICE

(76) Inventor: Margaret Dye Smith, Barrington, IL (US)

( * ) Notice: Subject to any disclaimer, the term of this patent is extended or adjusted under 35 U.S.C. 154(b) by 786 days.

(21) Appl. No.: 12/459,504

(22) Filed: Jul. 3, 2009

(65) Prior Publication Data

US 2011/0001012 A1    Jan. 6, 2011

(51) Int. Cl.
*B64C 31/06* (2006.01)
*A63H 27/08* (2006.01)
*A63H 33/40* (2006.01)

(52) U.S. Cl.
CPC ............. *A63H 27/08* (2013.01); *A63H 33/40* (2013.01)

(58) Field of Classification Search
USPC ................. 244/153 R, 154, 155 R, 155 A
See application file for complete search history.

(56) References Cited

U.S. PATENT DOCUMENTS

| | | | | |
|---|---|---|---|---|
| 606,960 A | * | 7/1898 | Doyle .................. | 244/153 R |
| 743,301 A | * | 11/1903 | Lischtiak ............ | A63H 27/08 244/153 R |
| 984,295 A | * | 2/1911 | Peuvot ................ | A63H 27/08 244/154 |
| 1,947,982 A | * | 2/1934 | Gerhardt et al. .... | 434/32 |
| 1,968,382 A | * | 7/1934 | Fales .................. | 73/147 |
| 2,839,259 A | * | 6/1958 | Mayne ................ | A63H 27/08 244/155 A |
| 2,911,745 A | * | 11/1959 | Simon ................ | 40/407 |
| 2,919,577 A | * | 1/1960 | Cone .................. | 73/181 |
| 2,941,765 A | * | 6/1960 | Feldman ............. | 244/153 R |
| 3,071,892 A | | 1/1963 | Clark | |
| 3,305,197 A | * | 2/1967 | Daggett .............. | 244/153 R |
| 3,465,471 A | | 9/1969 | Friedman | |
| 3,603,537 A | * | 9/1971 | Burke et al. ........ | 244/155 R |
| 4,051,622 A | | 10/1977 | Sharp | |

(Continued)

FOREIGN PATENT DOCUMENTS

DE    203 15 433    4/2004

OTHER PUBLICATIONS

Der Bau der Sau; Sep. 28, 2004; <www.fly-high.com/drachen/bastelonkel/saubilder/saubau1.htm>.*

(Continued)

*Primary Examiner* — Richard R. Green
*Assistant Examiner* — Michael A. Fabula
(74) *Attorney, Agent, or Firm* — Charles Meroni

(57) ABSTRACT

A kite assembly and method of flying a kite from a wind source such as a fan, generally indoors, incorporating multiple tethers to provide generally stable, controlled and sustainable flight. The kite assembly provides for multiple tethers set to appropriate lengths and tethered to appropriate places on the kite and the wind source. Multiple tethers help balance the kite and prevent the kite from flying out of the lifting zone of the airflow created by the wind source, when the wind source is stationary, rotated, oscillating or being moved around a room. The tethers generally diverge from the kite and as a result the kite flying characteristics or direction of flight can be controlled in ways not possible with traditionally tethered kites, which typically have single or converging tethers. Multiple kites may be flown from one fan, or connected to one another to form unique flying combinations.

62 Claims, 17 Drawing Sheets

(56) References Cited

U.S. PATENT DOCUMENTS

| | | | |
|---|---|---|---|
| 4,190,218 A * | 2/1980 | Cousens, Jr. | 244/155 R |
| 4,354,647 A | 10/1982 | Carpenter | |
| 4,805,853 A | 2/1989 | Battles | |
| 4,813,637 A * | 3/1989 | Bondestam | 244/153 R |
| 4,871,133 A | 10/1989 | Alonso | |
| 5,000,401 A | 3/1991 | Barone | |
| 5,027,539 A | 7/1991 | Orsini | |
| 5,125,177 A | 6/1992 | Colting | |
| 5,127,611 A | 7/1992 | Payne et al. | |
| 5,186,675 A * | 2/1993 | D. Stoddard | 446/199 |
| 5,196,675 A | 2/1993 | Stoddard | |
| 5,322,247 A | 6/1994 | Munday et al. | |
| 5,524,851 A | 6/1996 | Huang | |
| 5,762,293 A * | 6/1998 | Crosbie | A63H 27/085 244/153 R |
| 6,186,857 B1 * | 2/2001 | Gazit et al. | 446/226 |
| 6,283,816 B1 * | 9/2001 | Pascual | 446/34 |
| 6,443,397 B1 * | 9/2002 | Morris | 244/153 R |
| 6,588,706 B1 | 7/2003 | Jaquez | |
| 6,695,258 B1 * | 2/2004 | Chang | A63H 27/08 244/153 A |
| 2001/0053738 A1 * | 12/2001 | Pascual | 493/413 |
| 2003/0042366 A1 | 3/2003 | Britt et al. | |
| 2007/0084970 A1 | 4/2007 | Carlson et al. | |
| 2007/0295864 A1 | 12/2007 | Garvin | |
| 2009/0026320 A1 | 1/2009 | Borromo | |

OTHER PUBLICATIONS 3-4 line artistic kites: Der Bau der Sau; Apr. 19, 2009; <www.kiteplans.org/pln_1105>.*

Goy, Christophe; Royal Albatros New Zeeland; archive.org date of Apr. 27, 2009; <http://www.kiteplans.org/planos/albatros/albatros.html>.*

Gomberg, David; Dave's World: Livin large in lunen; Sep. 1, 2007; KiteLife; Issue 56; <http://kitelife.com/kl-archive/issue-56-daves-world-livin-large-in-lunen>.*

* cited by examiner

KITE FLYING METHOD, ASSEMBLY AND DEVICE

BACKGROUND OF THE INVENTION

Field of the Invention

The present invention generally relates to a kite assembly and a method for flying kites from a wind source such as a fan. More particularly, the present invention relates to a method and assembly for flying variously sized planar and three-dimensional kites from a stationary, rotated, or oscillating wind source such as a fan, generally indoors. By tethering the kite to a wind source via multiple tethers of appropriate length and tethered in appropriate ways to the kite and the wind source, generally stable, controlled and sustained flight is achieved.

Discussion of Prior Art

Kites have been around for thousands of years and they are a part of many different cultures around the world. Most contemporary kites have been developed with an eye toward outdoor kite flight, which activity is highly dependent upon proper weather conditions. The present invention was conceived to overcome the disadvantages of the conventional outdoor kite, and in this regard is designed to be used in combination with a controllable wind source such as a fan.

In this last regard, it has been noted that fans or comparable wind sources have been used to fly streamers. Streamers, however, are not kites. Streamers have little structural strength or form and they are not flown from the end of a tether or tethers, but are typically attached directly to the fan or similar wind source. While streamers are not kites, it is further noted that kites may be used to fly streamers that are attached to them for both aesthetic and aerodynamic purposes.

Some of the more pertinent prior art relating to aerodynamic wind-animated devices and the like are briefly described herein after.

U.S. Pat. No. 3,465,471 ('471 Patent), which issued to Friedman, discloses an Aerodynamic Toy. The '471 Patent describes an electric fan which directs air stream at a balloon. The direction of air stream and its velocity can be varied. The balloon carries legs to support it during lift-off and landing.

U.S. Pat. No. 3,603,537 ('537 Patent), which issued to Burke, discloses Induced Air Displacement Control of Flying Objects. The '537 Patent describes an apparatus comprising an object fastened to a tether and of lightweight construction so as to be elevated in response to airflow thereagainst, and air displacement means including a rotary blower and a flow director located for directing blower displaced air to flow toward said object to maintain the object in elevated condition and in a position determined by the length of said tether and the character of the air stream. The tether is of a length to maintain the elevated object in the blower displaced air exteriorly of and remotely from said flow director. The object is attached to only one tether.

U.S. Pat. No. 4,190,218 ('218 Patent), which issued to Cousens, Jr., discloses a Bike Kite. The '218 Patent describes a ball joint affixed to the harness of a kite and a kite string is tied at its first end to the ball joint. A kite tethering device is affixed to the frame of a bicycle for affixing the second end of the string to the bicycle. The kite tethering device comprises an elastic cord affixed at its first end to the second end of the kite string. The kite is attached to only one tether.

U.S. Pat. No. 5,196,675 ('675 Patent), which issued to Stoddard, discloses an Air Vent Toy. The '675 Patent describes an inflatable and deflatable air vent toy that remains stationary and does not move from a fixed position with the breeze of an oscillating fan.

U.S. Pat. No. 6,283,816 ('816 Patent), which issued to Pascual, discloses certain Miniature Kites and Method(s) for Making Them. The '816 Patent shows single line geometric shaped kites using bamboo and tooth pick-like sticks for their frames and they are covered in tissue paper. Pascual indicates that his kites may be tethered to a desk top fan and due to their very low weight they will remain aloft in the slightest breeze. If flown from a fan this single-tether kite would not stay aloft for very long especially if flown from an oscillating fan. Any outside gust or oscillation would unstable this very lightweight kite causing it to fly outside the fan's lifting zone and cease to fly. Flying the Pascual kite assembly from a fan could not have achieved stable and sustainable flight.

U.S. Pat. No. 6,443,397 ('397 Patent), which issued to Morris, discloses a Tether for Holding Promotional Materials. The '397 Patent describes a device including an aero-resistant shape, such a disc, airplane, kite or figure; and a semi-rigid tether attached to the shape. The aero-resistant construction essentially flies from an air vent of a car from a single semi-rigid pole. In this patent the kite is not truly airborne but is basically supported by the rigid pole.

From a review of the above-referenced patents and other prior art generally known to exist that the prior art does not teach multiply tethered kites whereby the multiple tethers provide the kite with a substantial measure of stability, control and sustainable flight when flown from a stationary or rotating or oscillating fan or comparable wind source. It should be understood that a kite flown by a single tether in front of a fan is very unstable and any outside wind source, or movement of an oscillating fan can easily cause it to become unstable and loose lift as well as causing it to fly out of the lifting zone of the airflow where it can no longer sustain flight.

In other words, the prior art fails to teach kites with multiple tethers that attach the kite to a stationary or rotating or oscillating fan or comparable wind source for generally stable, controlled and sustainable flight. The current method of using multiple tethers helps to stabilize the flight of the kite by using tethers that removably or non-removably attach to multiple places on the kite and to multiple places on the fan or wind source to substantially control the vertical, lateral and longitudinal balance of the aerodynamic forces of lift, drag, gravity, and thrust on the kite enabling generally stable, controlled and sustainable flight. The prior art thus perceives a need for such a method, assembly and device, as described in more detail hereinafter.

SUMMARY OF THE INVENTION

The method and assembly of the present invention relates generally to kites designed to fly from a wind source such as a fan, and in this regard provides a kite having two or more tethers that attach to the fan for generally stable, controlled and sustainable flight. The kites are designed with multiple tethers that permanently or removably attach the kite to a fan or comparable wind source enabling the kite to fly in the airflow generated by the fan, while remaining in generally stable and sustainable flight while the active fan is stationary, rotated, oscillating, or is moved around the room. Multiple individual kites may be flown from the same fan or wind source. In some combinations, one or more tethers of one kite may be tethered to another kite and fly interconnected, thus creating unique flying combinations.

A kite flying from a fan according to the present invention provides a fun and aesthetically pleasing experience at home, in offices, schools, hospitals, nursing homes and any other location where fans could be used. A kite assembly according to the present invention may be designed in a wide variety of planar and three-dimensional designs such as human figures, angels, pixies, birds, butterflies, animals, insects, cartoon figures, inanimate objects, imaginary creatures, or creations. All are given generally stable, controlled and sustainable flight from a fan or comparable wind source with sufficient power for the size of kite by means of the appropriate number and placement of tethers for the kite's individual flying characteristics, as generally depicted throughout the various example drawings in these specifications.

When tethered properly and with sufficient airflow velocity from the fan, the kites of this invention may move in any direction with the fan, provided the tethers are able to move in the same direction as the airflow. The fan housing may be rotated or rotating in any direction, up, down, around, or the fan may be oscillating or hand-held and walked around the room, or the kite may be controlled to simulate landing on a surface, all the while the kite continues to fly with generally stable, controlled and sustainable flight.

Due to the method of multiple tethering, kites of the present invention may fly symmetrically or asymmetrically in the airflow and yet will fly with substantial stability for as long as the airflow is maintained, and even if the airflow direction changes.

{Kites}

Kites according to the present invention may be any planar or three dimensional objects or shapes that have a sufficient lifting surface and are lightweight enough to fly from the end of tethers in a suitably strong airflow created by a wind source such as a fan. Kites may come in many styles, and many sizes depending on the size and airflow strength of the fan or wind source. Kites according to the present invention may be designed in a basic planar "two-dimensional" style or they may be designed in various three dimensional forms, such as the box-kite, triangular kite or the cylindrical/conical kite or other geometric or natural shapes. By way of example, kites may also use various wings (including wing designs of various shapes and dihedrals), parafoils, sled shaped designs, inflatable shapes, or balloon figures. Combinations of all of these types of designs may be utilized to create a composite kite.

With traditional outdoor kites the tether or tethers converge inward toward the tethering point. Kites of the present invention are designed to fly well indoors from a fan, using multiple tethers that generally diverge outward from the kite to the fan attachment points so as to balance the kite in the airflow. Such balanced kites are constrained from flying outside the lifting zone of the airflow of the wind source, and achieve generally stable, controlled and sustained flight. A kite flying from a fan according to the present invention may also be flown outside so long as the weather is calm or the outdoor wind strength is substantially less than the airflow generated by the fan.

{Fans}

A wind source, such as a fan, according to the present invention is any source of substantially constant airflow that has sufficient power to generate lift for the kite being flown, and has suitable locations for the attachment of tethers. Fans used to fly kites according to the present invention may be of almost any style and size, and may include but are not limited to desk fans, floor fans, wall mounted fans, window fans, hand-held fans, car fans, tower fans, box fans, utility or industrial fans or air conditioning units/utility vents. The preferred windsource for this invention is a fan. Fans typically comprise a fan base (sometimes including a stem), and a fan housing for protecting moving fan blades and motor parts. Tethers are generally attached or removably attached to the fan housing. Select tethers may also be removably or non-removably attached to other parts of the fan, such as the fan base. Preferably the fan housing remains coordinated with respect to the direction of the airflow. The fan housing may be fixed relative to its base or mount, or it may rotate or oscillate in any direction. An example is a common circular house fan that may be aimed in a desired direction, aimed higher or lower, or may often be set to oscillate about an axis. According to the present invention any part of the fan may be decorated with ornamental or pictorial scenes that provide depth perception which enhances the illusion of flight. Ornamental or pictorial scenes for the fan may be planar or three dimensional and may be permanently or removably attached or bonded or secured to the fan in a variety of areas, by a variety of ways and made from a variety of materials.

{Tethers}

Tethers according to the present invention attach permanently (or removably) to the kite and then attach removably (or permanently) to the fan to restrain the kite from flying outside the lifting zone of the airflow from the fan. In this invention, tethering means attaching a tether to one or more kite-to-tether attachment points and then to a tether-to-wind source attachment point, using removable or non-removable means of attachment at each attachment point. A tether according to the present invention is generally a single flying line, although a bridling configuration connected to a tether may also be used in the current invention. In this invention a combination of bridle and tether are generally referred to as a tether. In this invention the tether may also have tether overhang, which extends beyond the tether-to-windsource attachment point.

Tethers may be made from a variety of lightweight, suitably strong and flexible lines or threads, or other appropriate materials. The type of tethers used directly relates to the size and strength of the fan or wind source and the size and design of the kite within that wind source. The number of tethers required depends on the kite's overall design and flight characteristics. Select tethers may also be attached in more than one place on the kite or wrapped around various areas of the kite's construction for added stability.

Each tether attaches to the kite and fan by removable (or permanent) means of attachment that may include, but not limited to, gluing, taping, tying, stickers, hooks, loops, tabs, clamps, clips or a combination of means. In the preferred embodiment the tethers are permanently attached to the kite while the tethers are removably attached to the fan.

Multiple tethers attach to the kite and to the fan at multiple attachment points by various means such as attachment devices. The number of attachment points depends on the design of the kite. The length of each tether may be adjustable or predetermined. These tethers restrain the kite within the lifting zone of the airflow to enable generally stable and sustainable flight. The initial length of the tethers connecting the kite to the fan is determined by the size, design, and flying characteristics of the kite at the lowest practical airflow provided by an appropriately sized fan, as well as the width of the fan housing. In general, lower powered or smaller fans will require shorter tethers for successful kite flying, while higher powered or larger fans will be able to fly a kite with longer tethers. The tethers typically have tether overhang after the fan attachment points to allow a convenient method of repositioning the kite in the airflow. Tethers may also be lengthened by removably (or permanently) attaching extra tethering line, for example by tying, gluing or using loops, tabs or clips. Tethers or tether overhangs may also be cut shorter.

{Launching}

Launching the kite is typically achieved by first tethering the kite to the fan when the fan is not active. The tethers may be pre-marked to indicate attachment locations for first launching the kite from various sized fans. Then the fan is activated and, after observing the flight characteristics of the kite, adjustments to the tethers are made so as to achieve desired flight characteristics of the kite. For example, by leaving at least one tether attached to the fan the kite may be flown manually by holding one or more of the remaining tethers. This method also helps the user find the optimal attachment points on the fan or wind source from which to fly the kite.

Once the tether lengths and attachment points have been determined, many kites will launch themselves when the fan is activated. This self-launching will most readily occur when the kite, at rest with no airflow, lies substantially within the lifting zone of the airflow. In this case the kite will generally elevate itself to a final flying position when the fan is activated and the air flow increases from zero to a maximum value determined by the overall power of the fan and the setting of its airflow controls.

{Safety Devices}

Tether overhang is the part of the tether that extends beyond the tether-to-wind source attachment points in order to accommodate flying adjustments to the kites. These tether overhangs may become entangled with the rotating axle of the fan blades. In order to prevent this from happening, a safety device is attached at or near the free end of each tether overhang. Additional safety devices may be added at other locations on the tether overhang. Safety devices also facilitate location of tethers so that flying adjustments may be made. Safety devices may be coordinated with the design idea and complement the overall kite theme for additional aesthetic appeal. Safety devices may be designed in a mobile form. Safety devices are permanently or removably attached to tether overhangs in a variety of ways. Safety devices may have their own bridle for attaching or removably attaching to the desired location on the tether overhang. Safety devices may be-planar or three dimensional and are made from a variety of materials (for example paper, plastic, wood or metal) and they may be given additional weight if initially they are too light to prevent the tether overhangs being drawn onto or into the fan housing by the airflow intake.

{Aerodynamic Device}

Aerodynamic devices may be added to a kite to contribute additional amounts of balance or lift for aerodynamic purposes or a combination thereof. Some aerodynamic devices may look very ornamental but also add aerodynamic effects to the kite. Some of these aerodynamic devices may also carry written messages, for example they may be used to display advertisements, logos or personal messages. These aerodynamic devices may be planar or three dimensional and may be secured by a variety of means, including for example bonding, gluing, tying, removably secured through perforations, slits, tubes, tabs, reusable bonding tape as well as a combination of means. Decorative embellishments may also be added to the kite for ornamental and aesthetic appeal.

{Commercial Opportunities}

There are numerous commercial opportunities for kites flying from an indoor fan according to the present invention. These kites may be designed and manufactured as kite flying greeting cards that come ready to fly or as a partial craft activity. These kites may be designed and manufactured as a craft and educational activity. These kites give teachers another tool for teaching and experimenting with aerodynamics, perhaps inspiring students in artistic and scientific endeavors. These kites may be designed and manufactured as pre-fabricated toys. These kites may be used in commercial advertising campaigns as point-of-sale advertisements or as low cost give-aways. These kites may be designed and manufactured as, for example, business cards, name tags, place cards, gifts, party hats, favors, or decorative display items. These are just some of the many uses and possibilities of this invention.

The use of fans is expected to increase. Fans are a cost-effective alternative to air-conditioning at a time when global temperatures are warming at the same time as energy prices are increasing. Recent studies have shown that fans used at night help people to sleep better. Another study has shown that fans used in an infant's bedroom helps to prevent Sudden Infant Death Syndrome.

These kites would also make a great craft activity for a birthday party or just a rainy day. These kites could be coordinated with an educational lesson for schools. These kites would be wonderful for sick children who couldn't get outside to play, and if they had a temperature the fan would help to keep them cool. These kites flying from a fan or comparable wind source according to the present invention may provide a fun and aesthetically pleasing experience at home, office, school, hospital, nursing home or any other location where a fan would be used.

{Conclusion}

There has thus been outlined, rather broadly, the more important features of the invention in order that the detailed description thereof that follows may be better understood. It is to be understood that the invention is not limited in scope or application to the details of construction or arrangements of the components set forth in the following drawings or description. The invention is capable of other embodiments and of being practiced and carried out in various ways. As such, those skilled in the art will appreciate that the conception upon which this disclosure is based may readily be utilized as a basis for the designing of other methods, assemblies and devices for carrying out the several purposes of the present invention.

BRIEF DESCRIPTION OF THE DRAWINGS

Other features of my invention will become more evident from a consideration of the following brief descriptions of the example drawings accompanying this specification:

FIG. 10(*b*) is a second side view type sequential depiction of the kite assembly otherwise shown in FIG. 10(*a*) with low magnitude airflow, in the process of self-launching.

FIG. 10(*c*) is a third side view type sequential depiction of the kite assembly otherwise shown in FIG. 10(*b*) with full airflow, having self-launched into full flight.

FIG. 11(*b*) is a top view type serial depiction of a generic fan housing in various states of rotation about a substantially vertical axis to depict oscillatory motion of the fan while maintaining generally stable and sustainable flight of an asymmetrical kite assembly.

FIG. 12(*b*) is a side view type second sequential depiction of the fan and kite assembly otherwise shown in FIG. 12(*a*) in a second positioned state of rotation about a substantially horizontal axis FIG. 13(*a*) is a right lateral view of a generic fan housing showing first and second tethers with tether overhang and safety devices being removably attached to the fan at about the one o'clock and six o'clock positions.

FIG. 14(*b*) is a left lateral view of the generic fan housing otherwise shown in FIG. 14(*a*) showing a third tether with tether overhang and safety device, the tether being removably attached to the fan housing at about the nine o'clock position, placed at an alternative location on the fan housing.

FIG. 15(*b*) is a left lateral view of the generic fan housing otherwise shown in FIG. 15(*a*) depicting, at about the eight o'clock and nine o'clock positions, the removable attachment of loops in the second and third tethers (with optional tether overhang and safety devices) to second and third receiving clip and hook attachment devices on the fan housing.

FIG. 20(*b*) is a view along the direction of the airflow of the symmetrical kite of FIG. 20(*a*).

FIG. 20(*c*) is a partial perspective view of an asymmetrical kite flying tethered to a generic fan housing FIG. 20(*d*) is a view along the direction of the airflow of the asymmetrical kite of FIG. 20(*c*).

DETAILED DESCRIPTION

The detailed description set forth below in connection with the appended drawings is intended as a description of exemplary embodiments and is not intended to represent the only forms in which the embodiments may be constructed and/or utilized. The description also sets forth the method, assembly and construction of the invention in connection with the illustrated embodiments. However, it is to be understood that the same or equivalent methods, assemblies and construction may be accomplished by different embodiments that are also intended to be encompassed within the spirit and scope of the invention.

The present invention achieves generally stable, controlled and sustainable flight for planar and three dimensional kites 10 flown from a wind source such as a fan 12. The kites according to the present invention have been designed so as to be generally stable in flight by using multiple tethers 11 to generally control the vertical, lateral and longitudinal balance of aerodynamic forces of lift, drag, gravity and thrust on the kite 10 created by the airflow from a wind source such as a fan 12.

Figure 1:
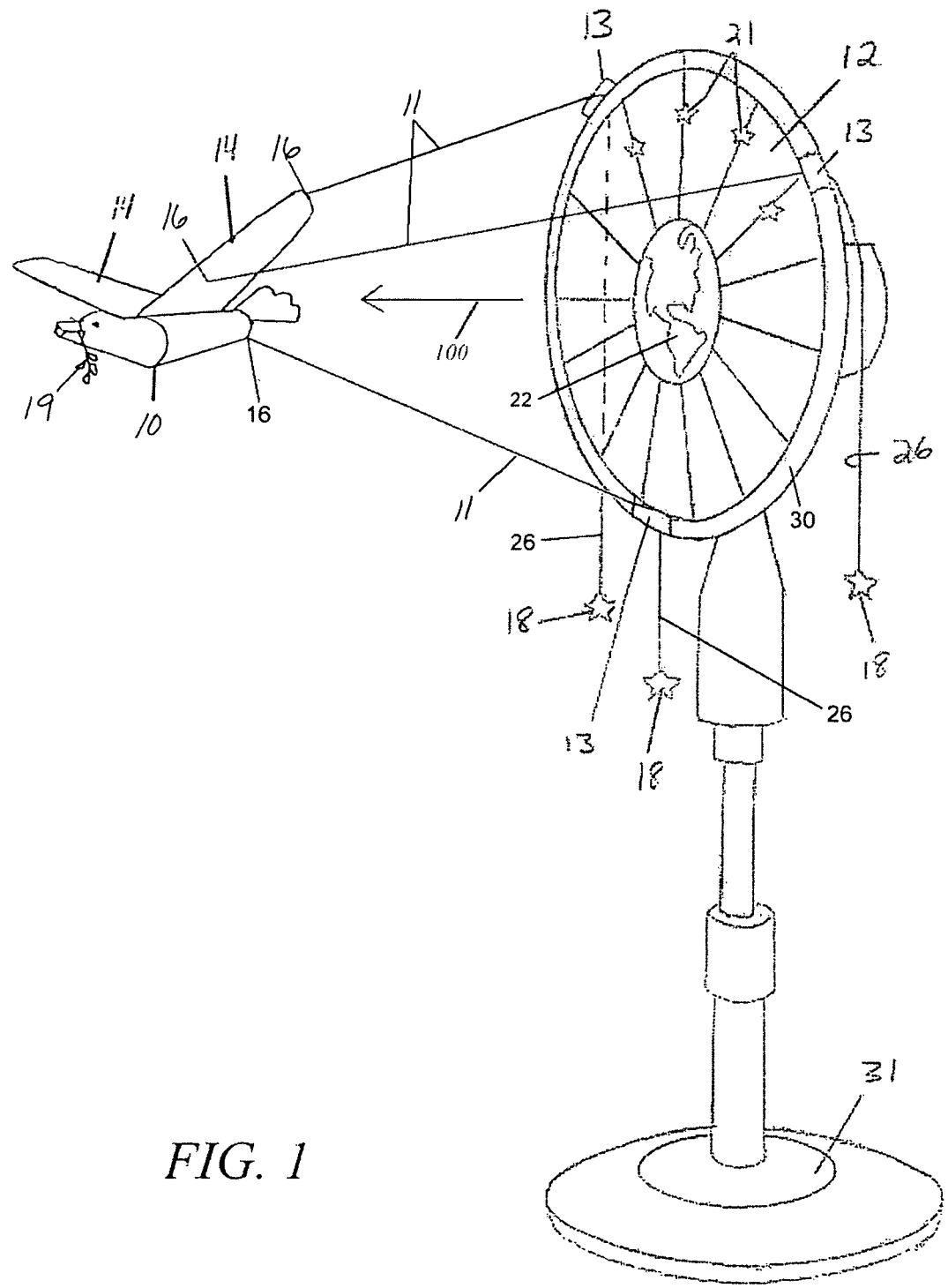
FIG. 1 is a frontal perspective view of a first kite assembly flying tethered to a first fan housing according to the present invention
Figure 2:
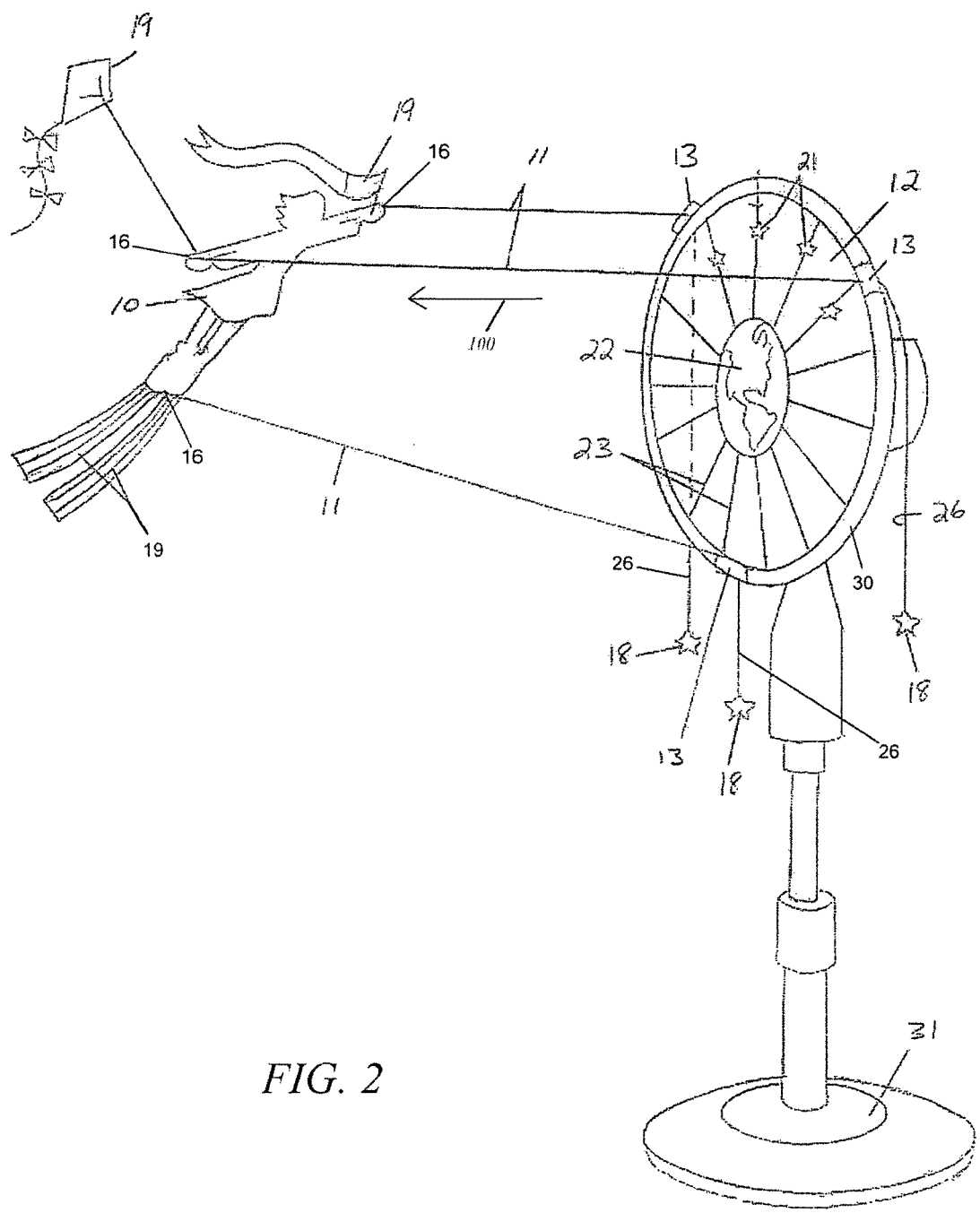
FIG. 2 is a frontal perspective view of a second kite assembly flying tethered to a first fan housing according to the present invention.
Figure 3:
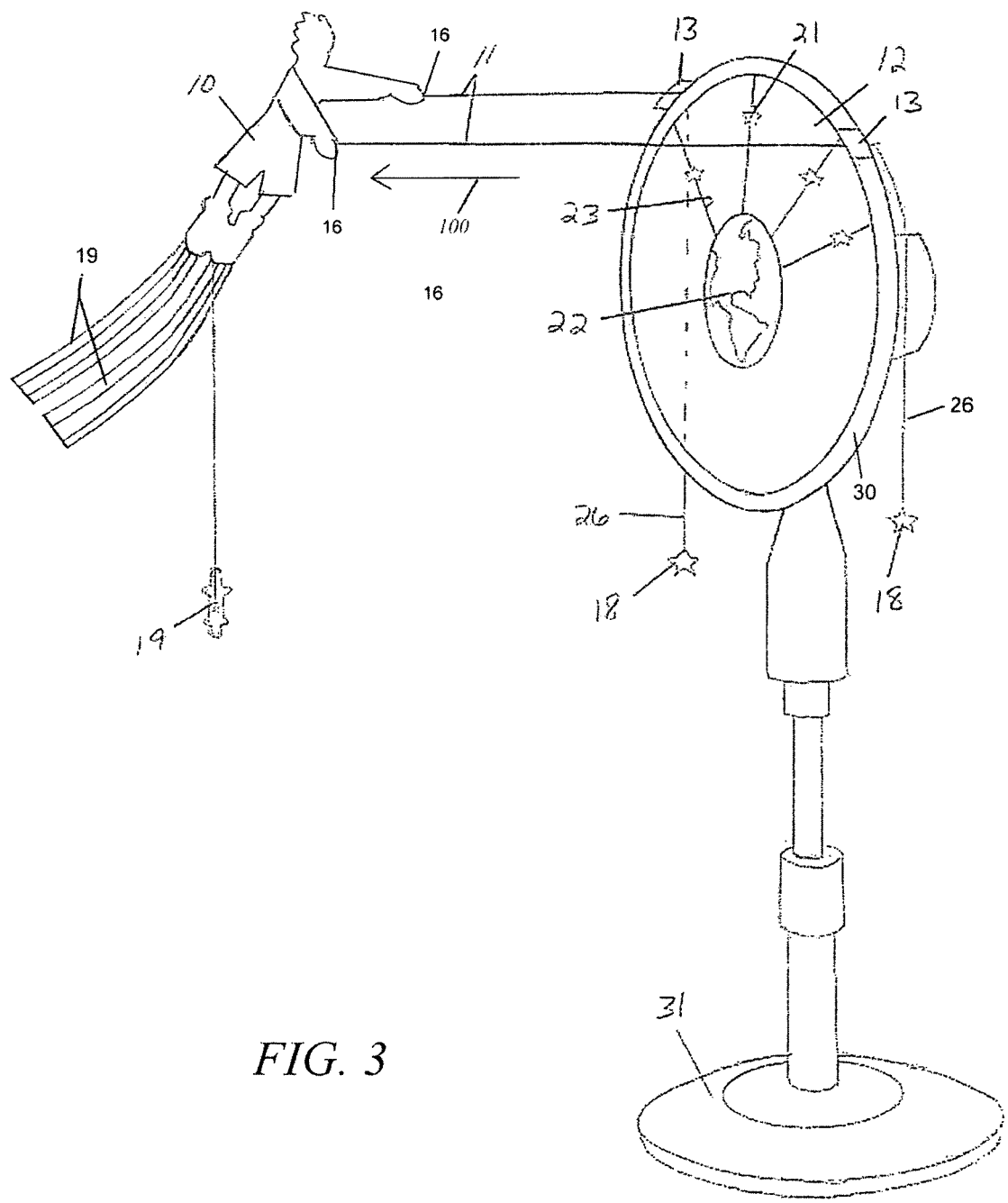
FIG. 3 is a frontal perspective view of a third kite assembly flying tethered to the first fan housing according to the present invention.

Kites 10 of this invention may be planar or three-dimensional and constructed from a lightweight material such as paper, oaktag, fabric, mylar, styrofoam, plastic, or a combination of lightweight materials. Referring to the examples in FIGS. 1 through 12(*b*), in order to achieve generally stable, controlled and sustainable flight for kites 10 flown from a wind source such as a fan 12, the present invention provides a kite 10 with a plurality of tethers 11 attached to the kite 10, which tethers 11 function to balance and contain the kite in the lifting zone of the airflow 100 of the fan or wind source 12 while they are tethered to the fan 12, which may be stationary, rotated, oscillating, or moved around the room. The fan 12 typically comprises a structural housing 30 for shielding users from moving parts such as fan blades (not specifically referenced), a base or stand as at 31 which sometimes includes a stem, as in FIG. 1 for example. Many other fan styles and variations of bases may be used including, for example, clip-on fans, tower fans, floor fans, window fans, desk fans, wall mounted fans, or box fans.

{Fan Attachment Points}

It will be further noted that the multiple lightweight and flexible tethers 11 are essential for keeping the kite 10 flying within the lifting zone of the wind source 12 with substantial stability, control and sustained flight as long as there is sufficient airflow 100. The optimal attachment points of the tethers 11 to the fan 12, as well as the tether length, depend on the design, flight characteristics, and size of the kite 10 and design style of the fan or wind source 12 as well as the velocity of the fan's airflow 100.

Tethers 11 may be attached to the wind source attachment points by permanent or removable means such as taping, gluing, tying, stickers, VELCRO®, magnets, clips, hooks, clamps or a combination of means (13 in FIGS. 1 through 15).

The optimal attachment points of the tethers 11 to the fan 12 may be pre-defined or may be located through experimentation by attaching at least one tether 11 to the fan 12 and manually flying and balancing the kite 10 with the remaining tethers 11.

Thus, it will be seen that the attachment points may be on the fan housing 30 (as in FIGS. 1, 2 and 3 for example) and some may be on the base 31 of the fan 12 (as in FIG. 4, for example) depending on the desired orientation of the kite 10 and/or the type of fan 12. Further, given a circular fan housing 30, the attachment points may be located at any number of peripheral points or clock positions about the fan housing 30 as generally demonstrated in FIGS. 13(a)-15(b). This principle generally applies to any shape housing 30. The attachment points are located on any part of the fan or wind source where the desired balance of the kite 10 in flight is achieved.

{Attachment of Tethers to Kite}

According to the present invention, tethers are attached to any location on the kite where the desired balance of the kite in flight is achieved. Tethers 11 may be attached to the kite attachment points by permanent or removable means (16 in FIGS. 1, 9, 19) such as bonding, gluing, taping, loops, hooks, tabs, clips, VELCRO®, tying, securing between cover sheets (160 in FIG. 8), enclosed and bonded in a folded appendage (17 in FIG. 16), or a combination of means. Tethers 11 may include bridling (146 in FIG. 6) which may further help to position and stabilize the kite 10 in the airflow 100 and/or reduce the number of tethers required or a combination of these.

{Tether Length}

Appropriate tether length is important for achieving stable, controlled and sustainable flight. The length of the tethers 11 are adjustable to accommodate repositioning of the kite 10 in the airflow 100 depending on the velocity of the airflow 100 from the fan 12. Generally, airflow velocity of a lesser magnitude requires a shorter length for the tethers 11. With airflow velocity of greater magnitude, however, longer tethers 11 may be used.

Figure 15A:
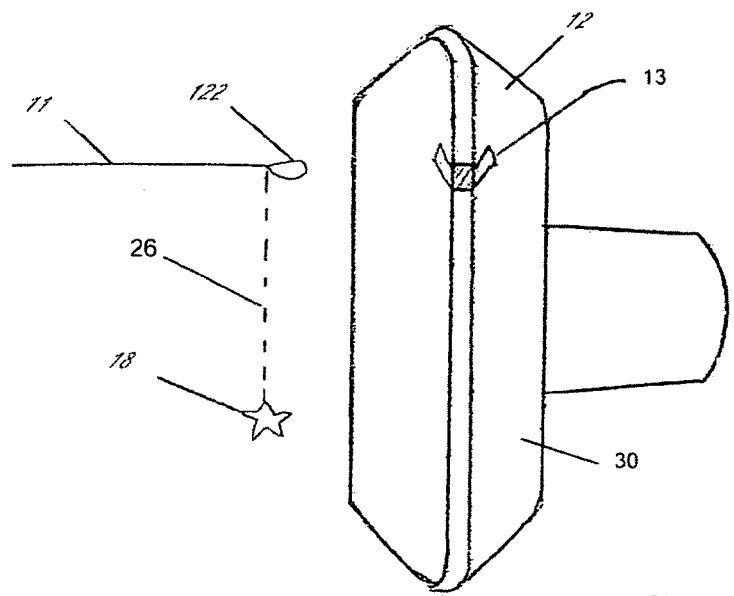
FIG. 15(*a*) is a right lateral view of a generic fan housing depicting, at about the one o'clock position, the removable attachment of a loop in the first tether (with optional tether overhang and safety device) to a first receiving clip and hook attachment device on the fan.
Figure 15B:
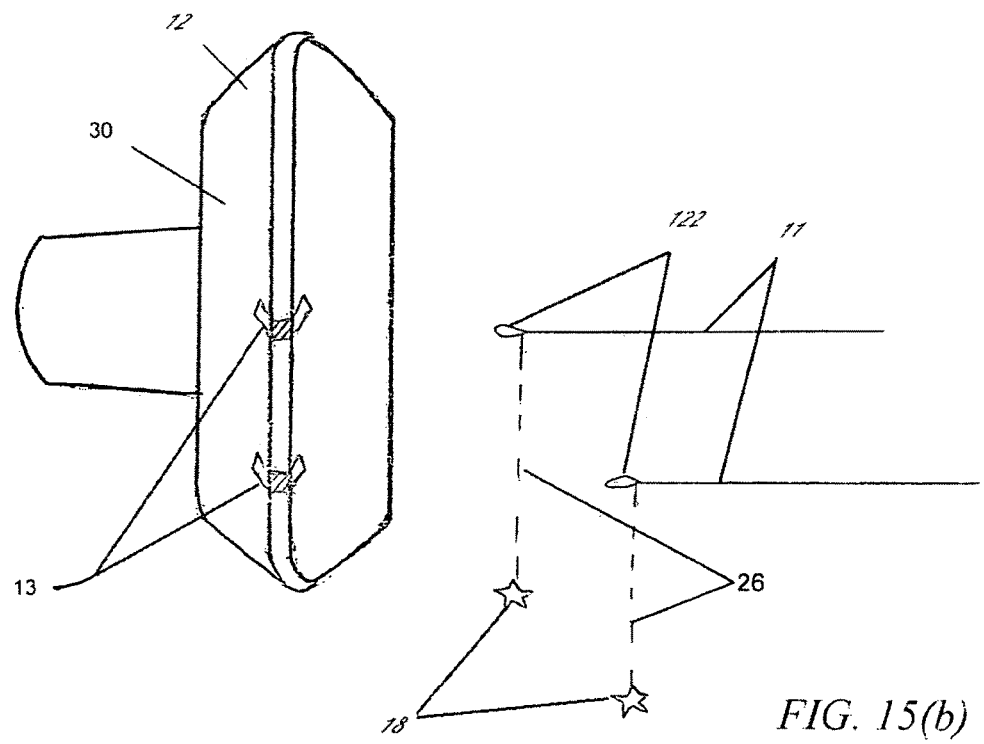

FIGS. 13(a)-14(b) depict examples of tethers 11 being removably attached to the wind source 12 by way of removable attachment devices 13 which, by way of example, are shown as a re-fastenable adhesive strips. In FIGS. 15(a) and 15(b) the removable attachment devices 13 are depicted, by way of example, as clip and hook devices removably attaching to loops 122 on the tethers 11.

If a kite needs longer tethers 11, for example for flying from a larger fan 12, additional tethering line may be permanently or removably attached, for example by clips, loops, hooks, tabs, gluing or tying. With removable tethers the tethering length may be replaced with longer or shorter tethers, such as 16 in FIG. 19.

{Tether Overhang}

A tether 11 typically has tether overhang 26 after the fan attachment point to permit a convenient method of adjusting tether length. It is contemplated that the tethers 11 if they have tether overhang 26 may be pre-marked to designate the shortest and most stable flying length from which to first launch the kite 10 from a specific size of fan 12 at the lowest practical airflow 100. If there is no tether overhang 26 then the tethers 11 may be set at the most stable length for flying in all airflow velocities, which would generally be at the lowest practical airflow 100.

Figure 12A:
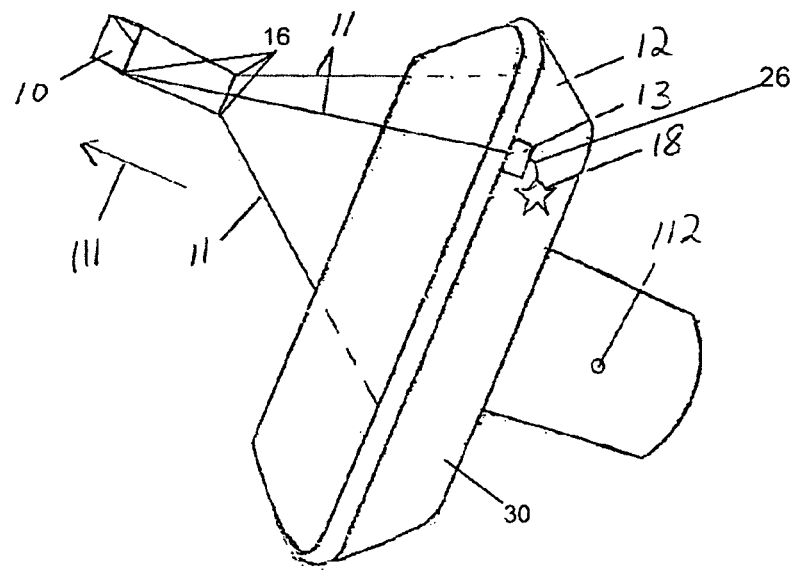
FIG. 12(*a*) is a side view type first sequential depiction of a generic fan housing flying a generic kite assembly in a first positioned state of rotation about a substantially horizontal axis.
Figure 12B:
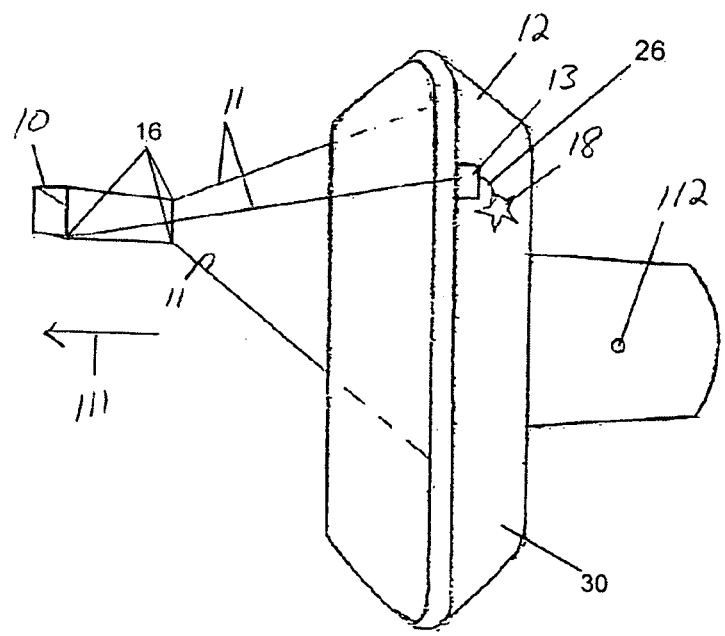
Figure 13A:
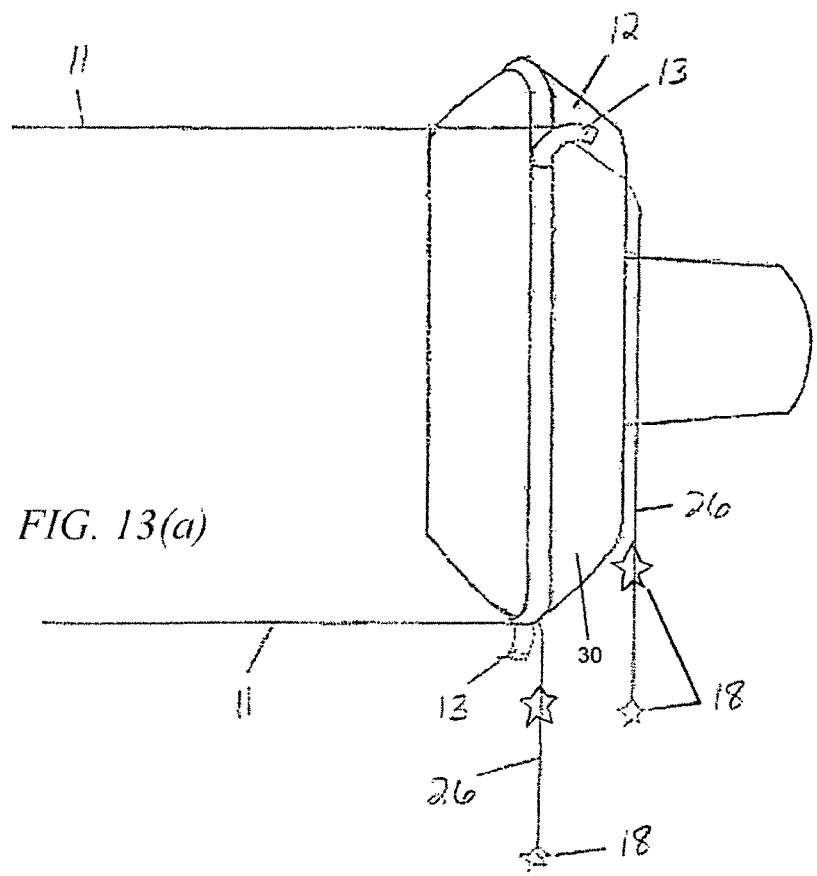
FIG. 13(*b*) is a left lateral view of the generic fan housing otherwise shown in FIG. 13(*a*) showing a third tether with tether overhang and safety devices, the tether being removably attached to the fan at about the eleven o'clock position; the second tether-attaching device being in a tether-receiving position.
Figure 13B:
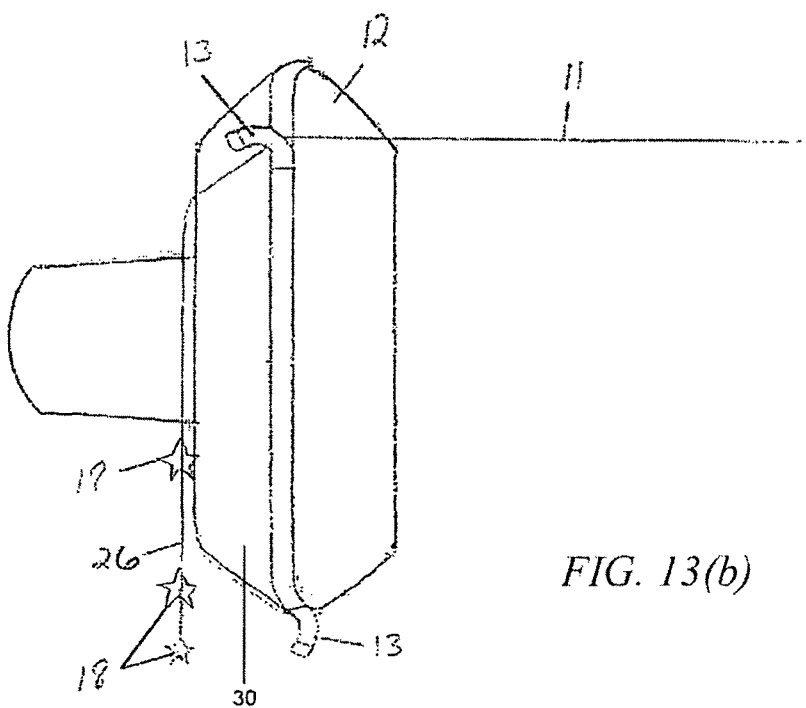
Figure 14A:
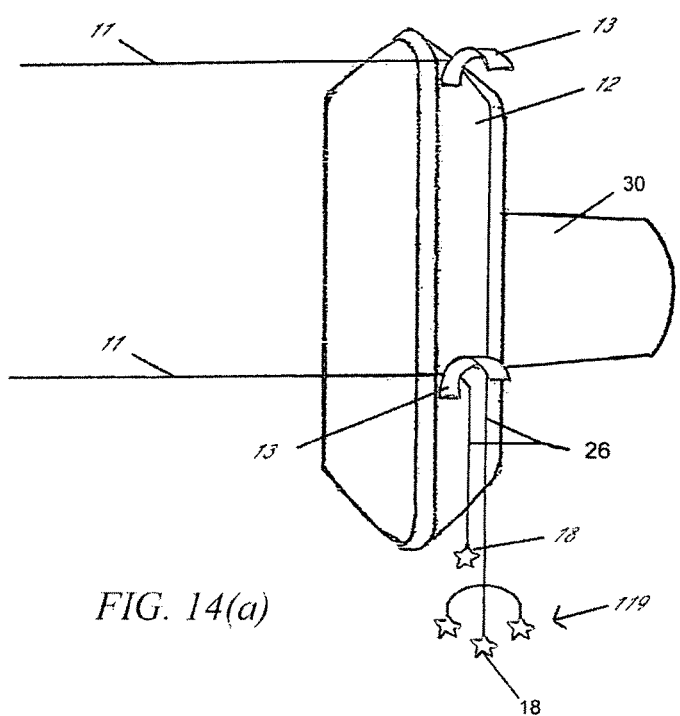
FIG. 14(*a*) is a right lateral view of a generic fan housing showing first and second tethers with tether overhang and safety devices, the tethers being removably attached to the fan at about the one o'clock and four o'clock positions, placed at an alternative location on the fan housing.
Figure 14B:
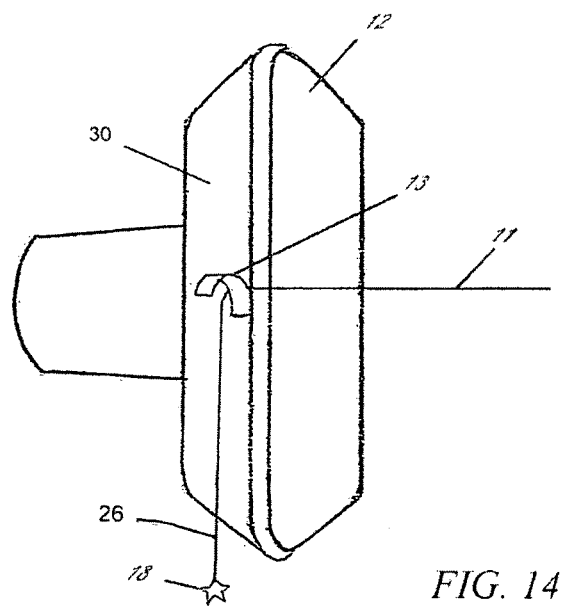

The length of the tethers 11 may be adjusted via the tether-to-wind source attachment points by manipulating the attachment devices 13 and adjusting the length of the tether overhang 26. FIGS. 12(a) and 12(b), for example, depict fully abbreviated tether overhangs 26 extending between the attachment device 13 and safety device 18 whereas FIGS. 13(a), 13(b), 14(a) and 14(b), for example, depict ample tether overhangs 26 for an adjustable tether length required for variations in airflow speed and flying characteristics.

FIGS. 13(a), 13(b), 14(a) and 14(b), for example, also depict attachment devices 13 released or in a tether-receiving configuration. Certain types of removable attachment devices permit tethers to be adjusted by simply pulling the tether through the attachment device.

{Safety Devices}

Tethers 11 may have safety devices 18 added at or near the end of the tether overhang 26. Tethers 11 may have other safety devices 18 added at any point along the tether overhang 26. These safety devices 18 essentially provide certain means for preventing tether overhang entanglement in the fan 12. Safety devices may also be complementary to the kite 10 in theme (for example 18 in FIGS. 1 through 6). Safety devices 18 attached to the tether overhangs 26 function to prevent the tether overhangs 26 from getting entangled in the fan 12. Further, the safety devices 18 make it easier to locate the tether overhangs 26. More than one safety device (for example 18 in FIGS. 13(a) and (b)) may be added to a tether overhang 26. These safety devices 18 may also be permanently or removably attached to the tether overhang 26 in a variety of ways. They may also be given a bridle (for example 148 in FIG. 6) to help position the safety device 18. Safety devices 18 may also be in a mobile configuration, for example as depicted by 119 in FIG. 14(a). Safety devices 18 may also be weighted to assist in retaining a substantially vertical line, or to further resist the tendency for tether overhangs 26 to be drawn onto or into the fan housing 30.

{Attachment Devices}

Tethers 11 may be designed with removable or non-removable attachment means on the tethers themselves, for example loops (122 in FIGS. 15(a) and 15(b)), hooks, circular devices, or clips on the tethers that may be removably (or non-removably) attached to a complementary removable or non-removable attachment means 13 on the fan 12, or directly to the fan 12. These tethers 11 may or may not have tether overhang 26 or safety devices 18.

A wide variety of attachment means for tethering the kite to the fan are possible (with or without tether overhang 26 and safety devices 18) and would vary greatly with the design and size of the kite 10 or wind source 12. The preferred attachment means 13 for tether-to-windsource attachment points is an attachment device 13 that is removable from the tether 11 and the fan 12.

{Aerodynamic Devices}

Kites 10 may also be outfitted with additional aerodynamic devices (for example 19 in FIGS. 1, 2, 3, 5 & 6) for aerodynamic purposes such as stabilizing, ballast, additional lifting surfaces, or a combination thereof. These aerodynamic devices 19 may be designed to also add decorative appeal. Aerodynamic devices 19 may carry messages. These aerodynamic devices 19 may be removably (or non-removably) attached in the desired area of the kite through various means such as perforations, slits, tubing, glue, loops, tying, tape, or combination of means. In other words, the aerodynamic devices 19 function to enhance the aerodynamic forces of lift or balance or a combination thereof while enhancing the visual appeal of the overall assemblage.

{Decorative Images}

Planar or three dimensional scenes (such as 21 and 22) may be removably or non-removably attached to the fan or wind source 12 to complement the theme of the kite. As an example it may be seen from an inspection of FIGS. 1 & 2 that the fan 12 has a combination comprising star-shaped devices 21 added to the spokes 23 of the fan housing 30 and an Earth-like depiction 22 is added to the centralized hub of the fan housing which creates depth perception while enhancing the visual illusion of flight. Other decorative scenes and embellishments may be added to the fan 12 to create alternative aesthetically pleasing scenes, which enhance depth perception, while enhancing the visual illusions of flight. Decorative scenes may be removably or non-removably attached to any desired location on the fan 12.

{Method}

It is noted that any motion of an oscillating fan or other surrounding breezes or air turbulence such as a person passing by can easily destabilize a lightweight kite as flown from a fan or wind source by a single tether. Therefore, for generally stable, controlled and sustained flight from a fan 12 with sufficient airflow 100, a plurality of tethers 11 are required. The number of tethers required to contain and hold the kite 10 within the lifting zone of the fan or wind source 12 depends on the design of the kite and its flight characteristics.

Figure 11A:
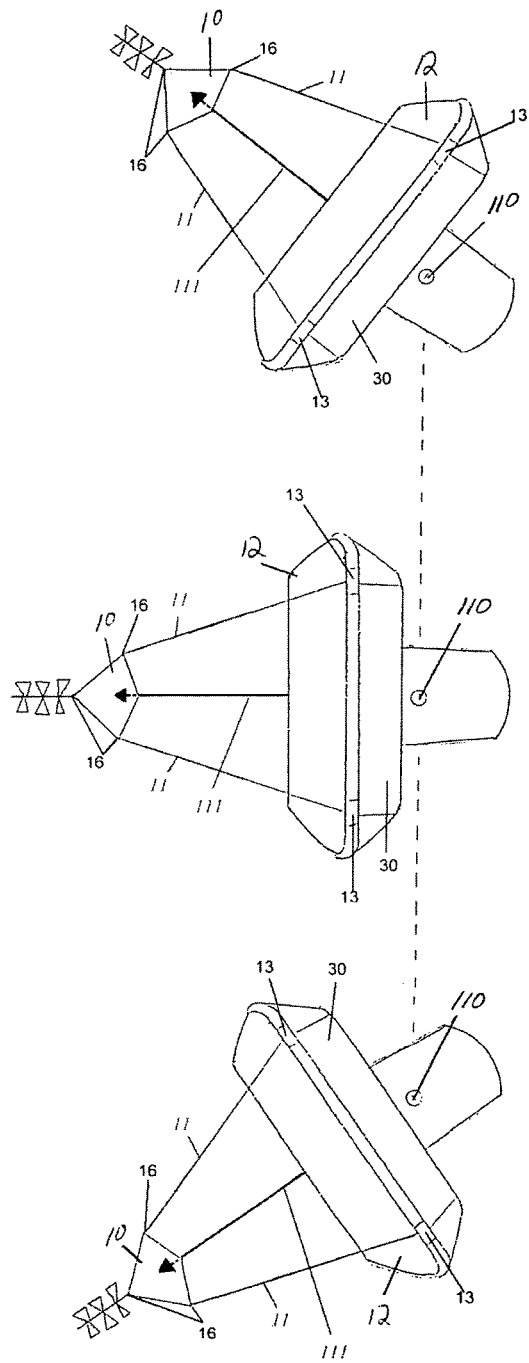
FIG. 11(*a*) is a top view type serial depiction of a generic fan housing in various states of rotation about a substantially vertical axis to depict oscillatory motion of the fan while maintaining generally stable and sustainable flight of a symmetrical kite assembly.
Figure 11B:
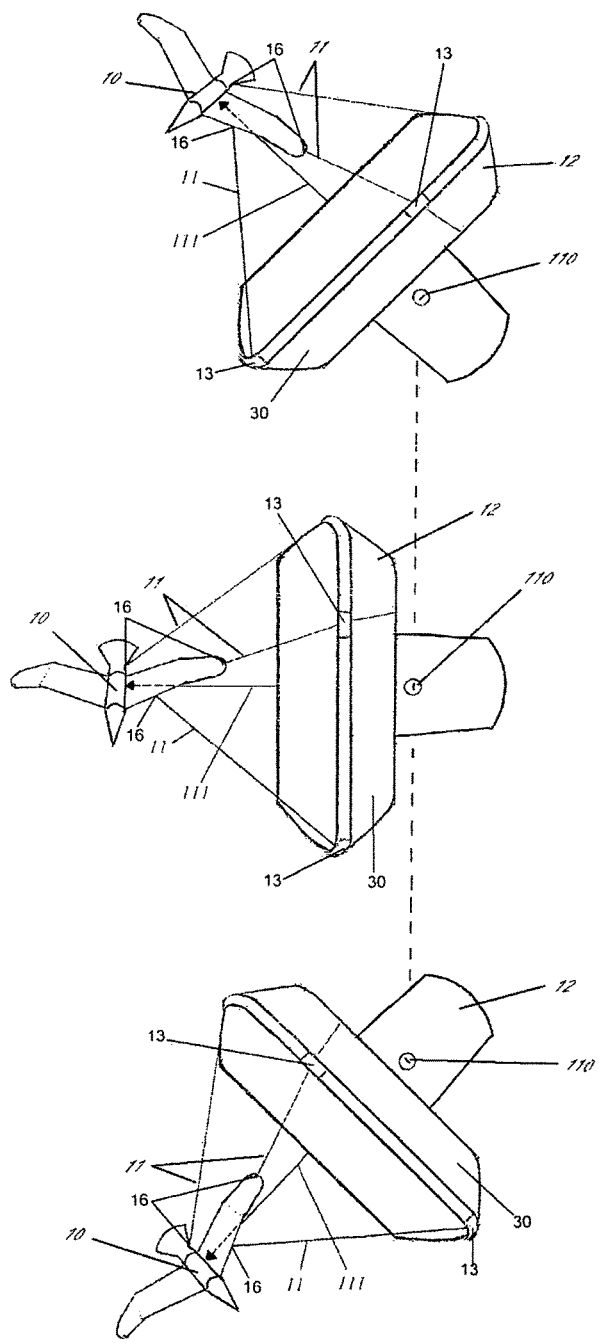

Because the tethers 11 contain and balance the kite 10 within the lifting zone of the airflow 111 and because these tethers attach the kite to the fan 12, the kite 10 moves in the direction of the fan 12 and the airflow 111 if the fan housing 30 moves in unison with the airflow direction 111. Therefore the fan 12 may be stationary, rotated (as depicted in FIGS. 12(*a*) and 12(*b*)), or oscillating (as depicted in FIGS. 11(*a*) and (*b*)) and the kite will continue to fly with generally stable and sustained flight.

The kite 10 may be repositioned by adjusting the length of tethers 11 via the tether-to-wind source attachment devices 13 or by adjusting the length of the tether overhang 26 or by relocating the tether-to-wind source attachment points or a combination thereof. The kite 10 may also be repositioned and/or manually flown by leaving one or more tethers 11 removably attached to the fan 12 and by manually maneuvering one or more of the remaining tethers.

{Self Launching}

Figure 10A:
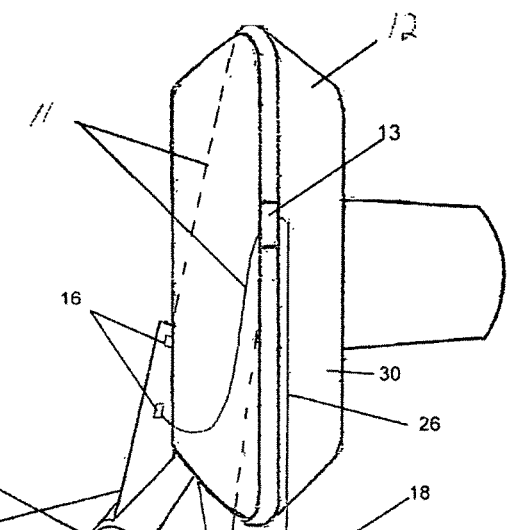
FIG. 10(*a*) is a first side view type sequential depiction of a kite assembly tethered to a generic fan housing with no airflow, prior to self-launching.
Figure 10B:
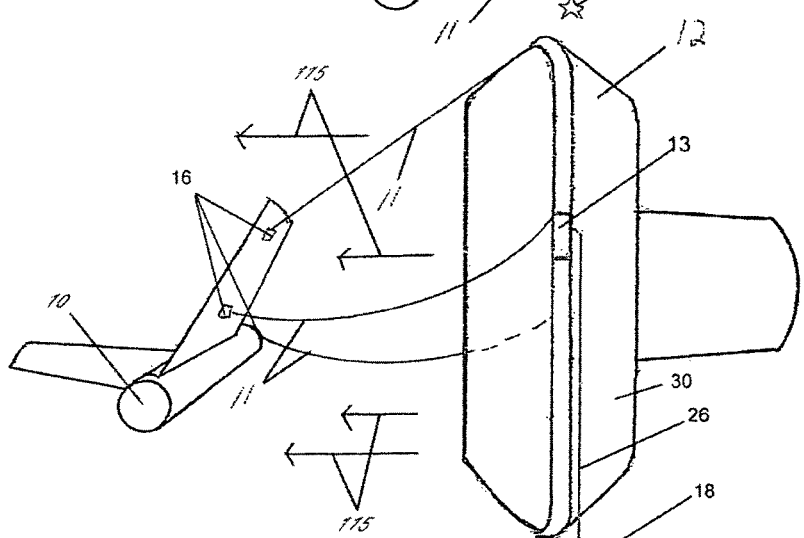
Figure 10C:
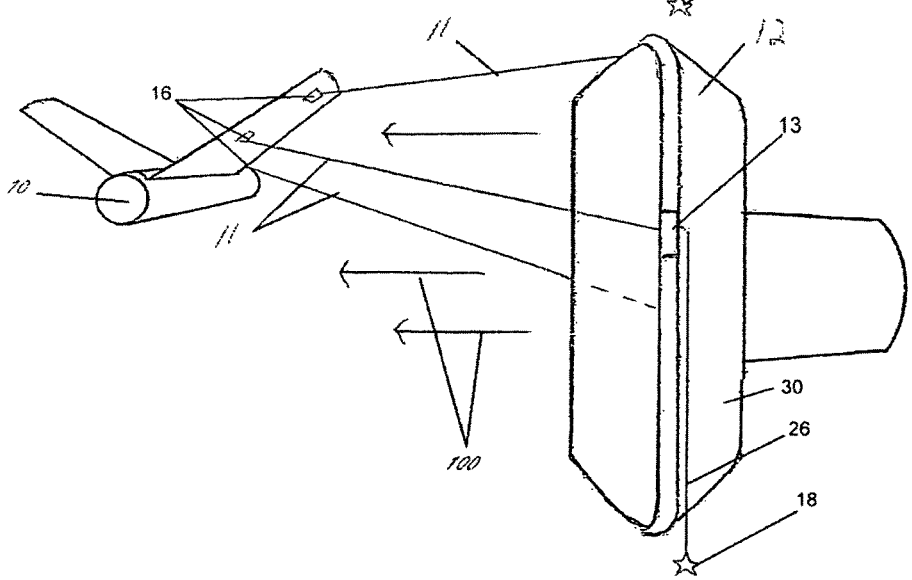

Once a kite 10 is correctly tethered to fly stably within the lifting zone of the wind source 12, then the kite may be self-launching when the airflow is initially activated (as in FIGS. 10(*a*), 10(*b*), and 10(*c*) for example). This is especially convenient when using a remote control fan. This self-launching will most readily occur when the kite 10, at rest with no airflow, lies substantially within the lifting zone of the airflow. FIGS. 10(*a*), 10(*b*), and 10(*c*) depict a kite 10 in various states of self-launching. FIG. 10(*a*) depicts the fan or wind source 12 in an inoperative mode with no airflow and kite 10 resting substantially in the lifting zone. FIG. 10(*b*) depicts the fan or wind source 12 in an operative mode with low magnitude, kite lifting airflow velocity as generally referenced at vector arrows 115. FIG. 10(*c*) depicts the fan or wind source 12 in an operative mode with higher magnitude, kite-lifting and kite-stabilizing airflow velocity 100. It will be noted from a comparative inspection of the noted figures that the airflow velocity 115 is lesser in magnitude than the airflow velocity 100.

{Rotation & Oscillation}

In a preferred embodiment a kite 10 will remain generally stable in flight, and remain within the lifting zone of the airflow, during the rotation or oscillation of the fan housing 30.

FIGS. 12(*a*) and 12(*b*), for example, depict a first and second rotational position of the fan 12 that is being rotated about a substantially horizontal axis 112, as is commonly possible with commercially available fans. Once the kite 10 has achieved generally stable and sustainable flight in one position (FIG. 12(*a*)), the tethers 11 generally remain under tension such that the kite 10 remains generally stable in flight, and remains within the lifting zone of the airflow 111, during rotation to the second position (FIG. 12(*b*)).

FIGS. 11(*a*) and 11(*b*), for example, respectively depict a series of fans 12 oscillating about a substantially vertical axis of rotation as at 110. In other words, each of the figures respectively display with a series of views (from top to bottom) oscillatory motion about the axis of rotation 110. Notably, from an inspection of the noted figures, it will be seen that the tethers 11 generally remain under tension such that the symmetrical kite 10 in FIG. 11(*a*) and asymmetrical kite 10 in FIG. 11(*b*) remain generally stable in flight, and remain within the lifting zone of the airflow 111, during the oscillatory motion.

{Symmetrical and Asymmetrical Flight}

With regards to the placement chosen for the tethers 11 on the kite 10 and on the fan or wind source 12, these placements can greatly affect the angle of the kite 10 both with planar and three-dimensional kite designs as, for example, in FIGS. 20(*a*) and 20(*c*). In other words, the placement of the tethers 11 allows the kite 10 to fly at various positions relative to the airflow direction 111 of the fan or wind source 12. This last point is especially important and unique for flying a planar or three-dimensional kite 10 asymmetrically relative to the airflow direction 111. By way of example, referring to FIG. 20(*c*), by placing two tethers 11 on one wing 14 instead of one tether 11 on each opposite wing 14, and a third tether placed elsewhere on the kite for further balance, the kite 10 is thereby asymmetrically tethered. Further, the kite 10 is tethered generally symmetrically or asymmetrically to the fan 12. The kite 10 is thus able to be flown generally sideways and asymmetrically relative to the airflow direction 111 thereby creating the appearance that the kite 10 is flying generally across the fan or wind source 12 as opposed to substantially straight out from or into it. It is to be noted that asymmetrical tethering is generally applicable to any planar or three dimensional kites (not just those with wings) to uniquely permit the kite to fly at various positions relative to the airflow direction 111 of the fan or wind source 12.

In general, kites of the present invention can fly generally symmetrically or asymmetrically with respect to the direction of the airflow 111. For example, FIG. 11(*a*) and FIG. 20(*a*) depict a symmetrical kite 10, with generally symmetrical kite-to-tether attachment points 16, tethered generally symmetrically or asymmetrical to fly from a fan 12. FIGS. 11(*a*) and 20(*a*) comparatively depict the symmetrical kite of FIG. 20(*b*), wherein the symmetrical kite 10 possesses a mirror line 140 such that, when viewed in the direction of the airflow as shown at the vector arrow 111, the portions 142 presented to the airflow on the left of the mirror line 140 are a mirror image of the portions 144 to the right of the mirror line 140. Many popular outdoor kites are of this symmetrical design so as to achieve stable flight outdoors with just a single tether.

FIG. 20(*c*), for example, depicts an asymmetrical kite 10 with asymmetrical kite-to-tether attachment points 16, tethered generally symmetrically or asymmetrically to fly from a fan 12. FIG. 20(*c*) comparatively depicts the asymmetrical kite of FIG. 20(*d*), wherein the asymmetrical kite has no such mirror line when viewed in the direction of the airflow as clearly shown at the vector arrow 111 pointing into the page (and towards the kite) on FIG. 20(*d*). The portions presented to the airflow 111 on the left 142 of any proposed center line (for example 141) is not a mirror image of those to the right 144 of any proposed center line. While some may have symmetry when viewed from a different direction, the shape presented to the airflow 111 has no mirror line. Asymmetric kites are not commonly found among popular outdoor kites because they are difficult to design and balance, if they fly at all.

As additional examples, the three dimensional kites in FIGS. 1, 6, 8, and 9 may all be tethered so that they appear to fly across the direction of airflow 100 rather than into it or away from it. Also, the asymmetrical kite 10 in FIG. 2 has generally symmetrical kite-to-tether attachment points 16 which are tethered generally symmetrically or asymmetrically to the fan 12.

{Multiple Kites}

Figure 5:
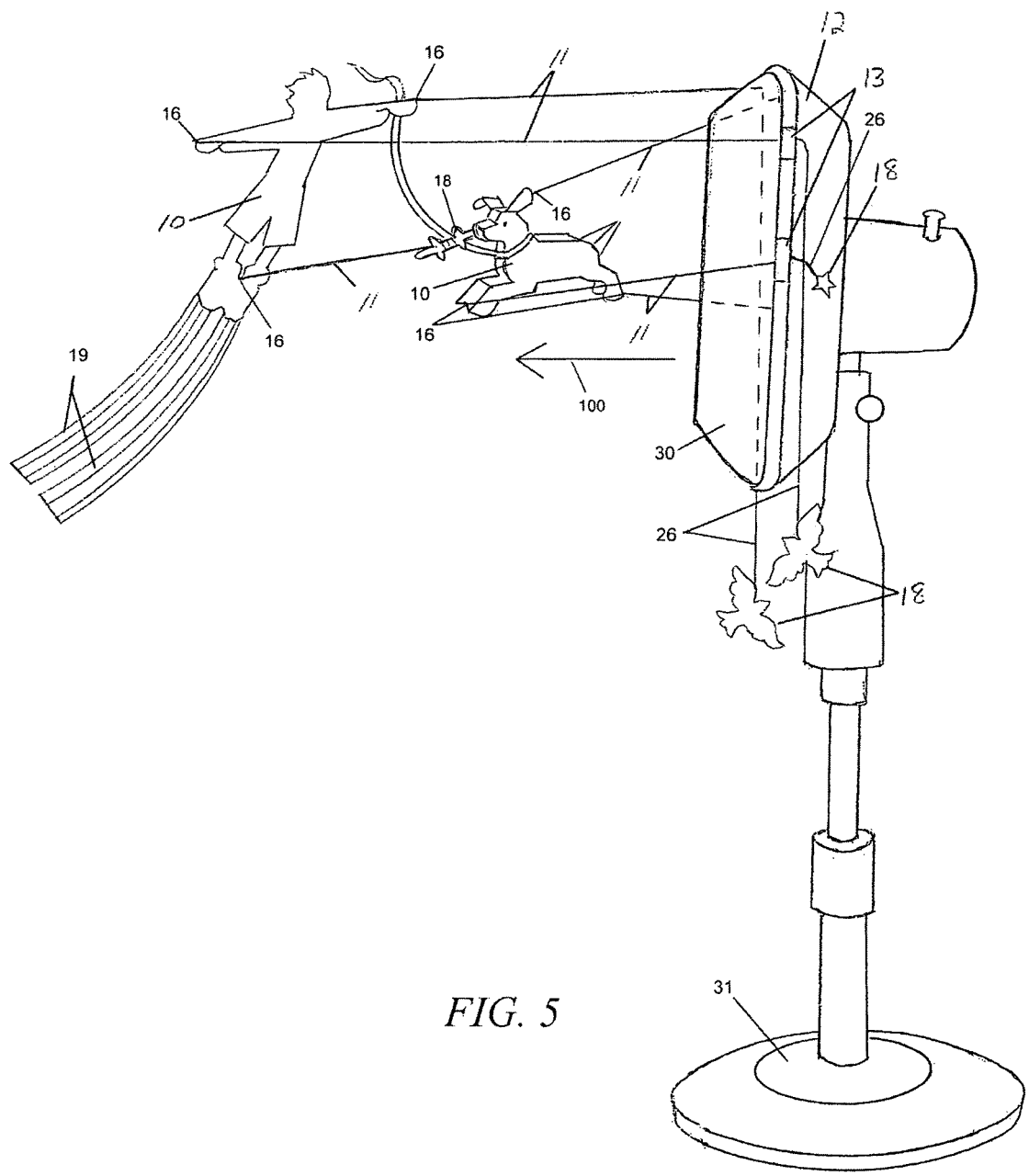
FIG. 5 is a partial perspective view of the third kite assembly partially tethered to a fourth kite assembly to create an assembly of multiple interconnected kites, flying tethered to a single fan housing.
Figure 6:
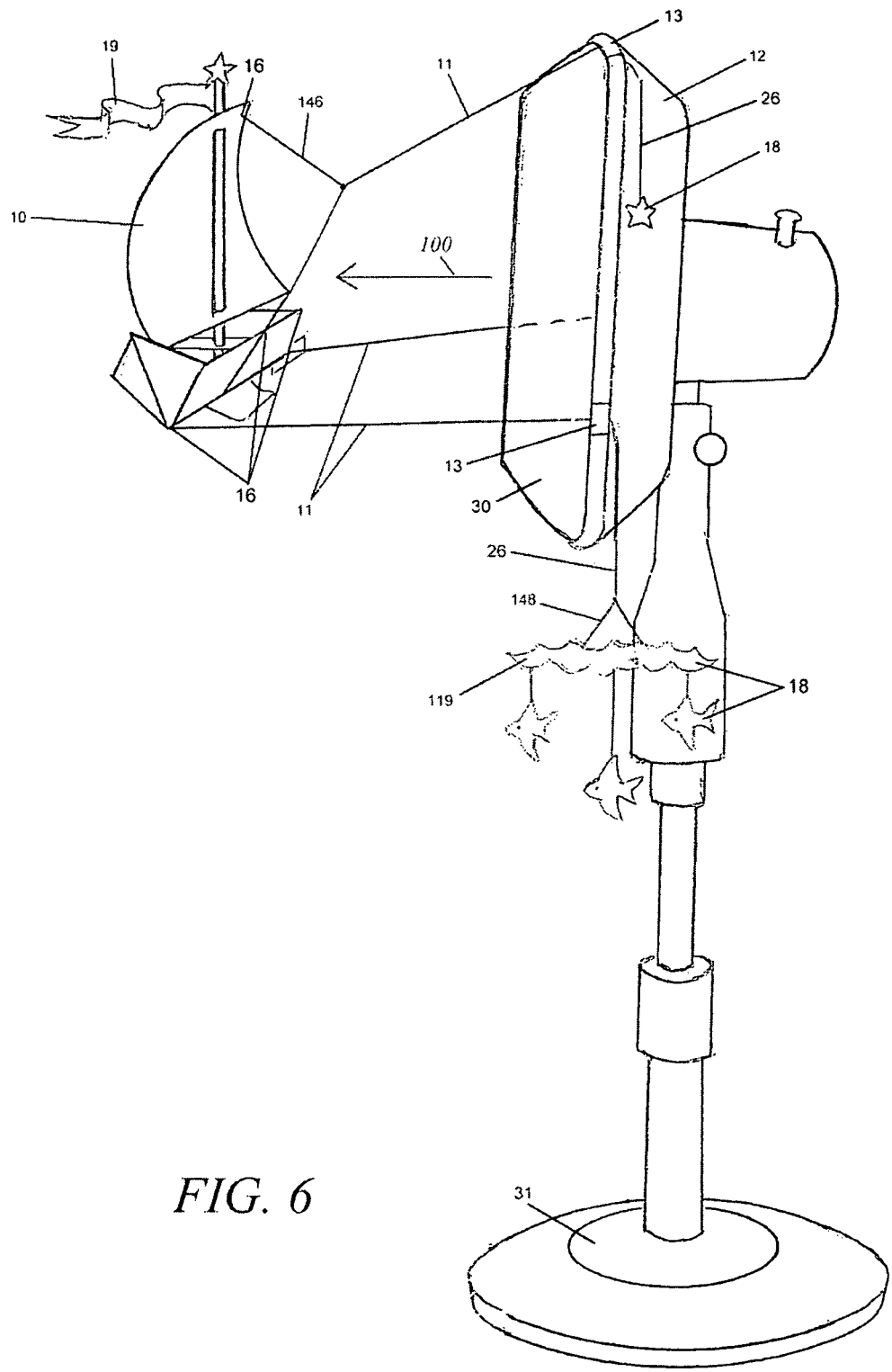
FIG. 6 is a partial perspective view of a fourth kite assembly flying tethered to a fan housing by three tethers, the topmost tether being attached to a bridle that is connected to the kite; and safety devices attached to a bridle that is attached to a tether overhang.
Figure 7:
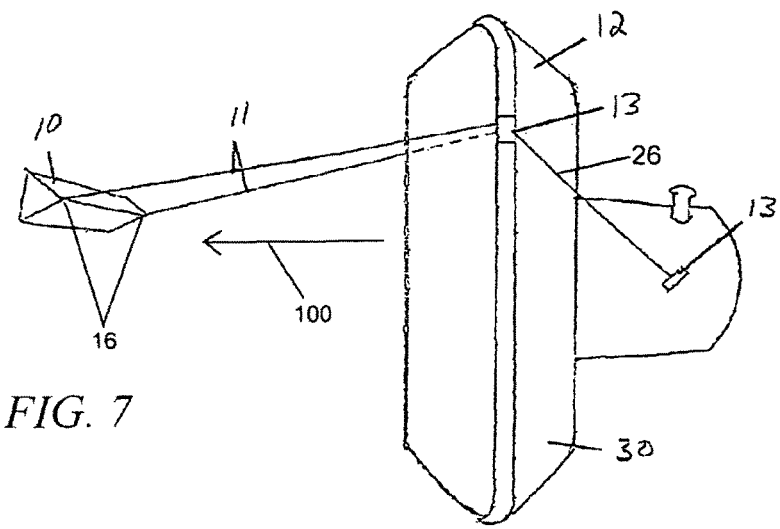
FIG. 7 is a partial perspective view of a three dimensional triangular kite assembly flying tethered to a generic fan housing.

Interconnected kites may help fly one another from a single fan source. By way of example, as depicted in FIG. 5 the tether of one planar,symmetrical kite 10 (in the shape of a person) is removably or non-removably attached by a tether 11 to a three-dimensional, asymmetrical kite 10 (in the shape of a dog), creating a unique flying combination.

Figure 4:
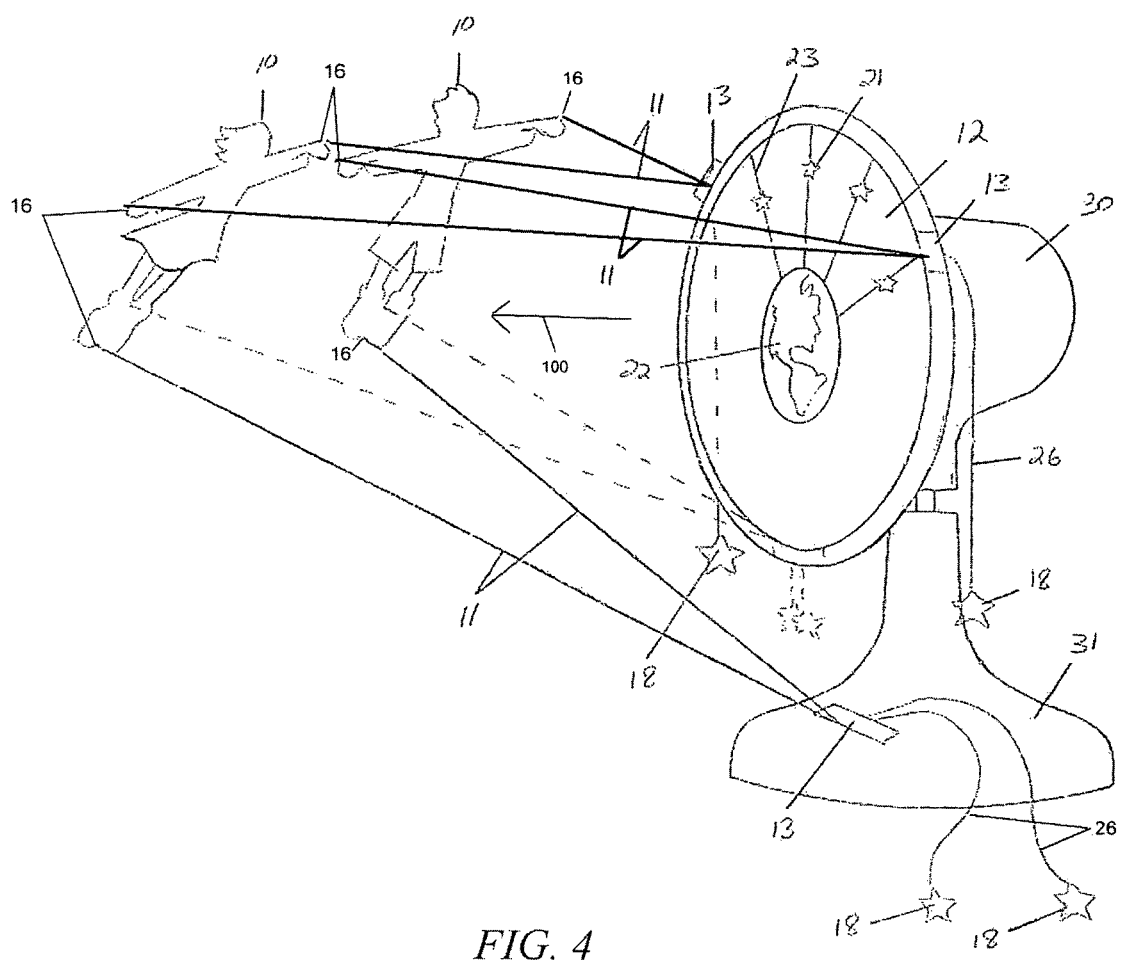
FIG. 4 is a frontal perspective view of a second and third kite assembly individually flying tethered to a single second fan housing and base according to the present invention, also showing alternative attachment location on the fan housing.

Multiple kites 10 may fly individually while separately tethered to the same fan 12, as for example in FIG. 4.

{Wing Design}

Figure 8:
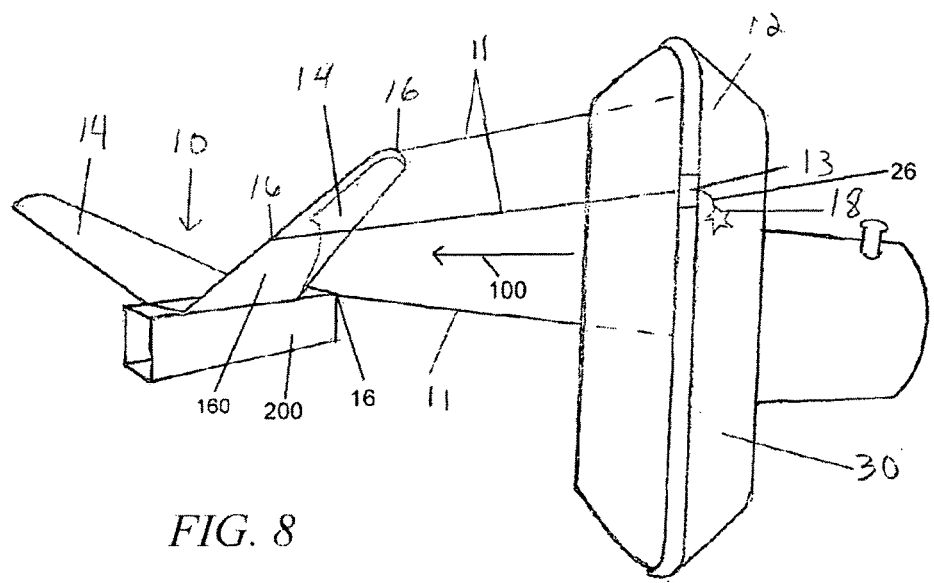
FIG. 8 is a partial perspective view of a three dimensional kite assembly having fuselage spanning dihedral wings flying tethered to a generic fan housing.
Figure 9:
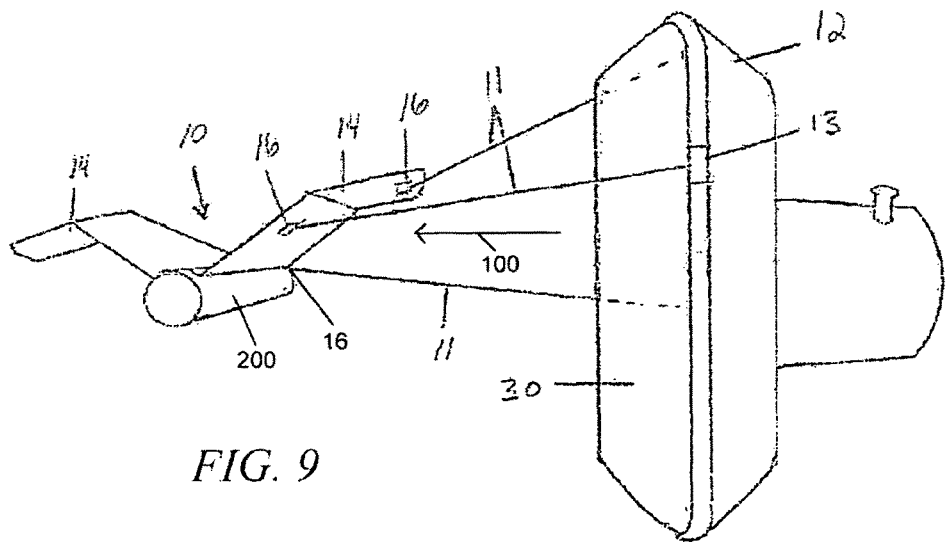
FIG. 9 is a partial perspective view of a three dimensional kite assembly having fuselage spanning polyhedral wings flying tethered to a generic fan housing.

Kites 10 according to the present invention may be designed with one or more sets of wings (for example 14 in FIGS. 8 and 9). Three dimensional kites may have wings 14 located at various locations on the kite. These wings 14 may be designed in various shapes and sizes. Kites 10, for example, may have wings 14 that span the fuselage 200 that are straight or wings that are dihedral (FIG. 8) or polyhedral (FIG. 9).

By way of example, dihedral wings (14 in FIG. 8) and polyhedral wings (14 in FIG. 9) may be angled, bent or folded in an upward or downward direction (14 in FIG. 9 for example). Some angles may be fixed while some angles may be flexible in response to the forces acting on them. This is an advantage for added stability, lift and/or for folding for storage or mailing purposes.

{Structural Support}

A kite 10 is thus disclosed having a lifting surface with various forms of structural support and flown from the end of multiple tethers 11 in the airflow 100 provided by a fan or comparable wind source 12.

{First Construction Style}

A first application of structural support is designed into the kite's coversheet 160. By using a relatively lightweight, stiff yet flexible coversheet material a planar kite 10 (as seen for example in FIG. 3, FIG. 4, and FIG. 11(*a*)) and a three-dimensional kite 10 (as seen for example in FIG. 1, FIGS. 5 through 10, FIG. 11(*b*) and FIG. 12(*a*)) may be created. The frame and coversheet 160 may be essentially one and the same. For example in FIGS. 16-18(*b*) the coversheet 160 may be designed to fold or refold in various areas 17 to hold the tethers 11, and add structural strength because of the folding or overlapping process or a combination thereof. This is a unique way of building a kite 10 because there is no completely separate frame for the kite of a relatively small or miniature size. This construction method may be used to create planar kites or three-dimensional kites. A variety of lightweight construction materials may be used, for example paper, plastic, fabric, styrofoam, mylar, or a combination of lightweight construction materials.

Figure 17:
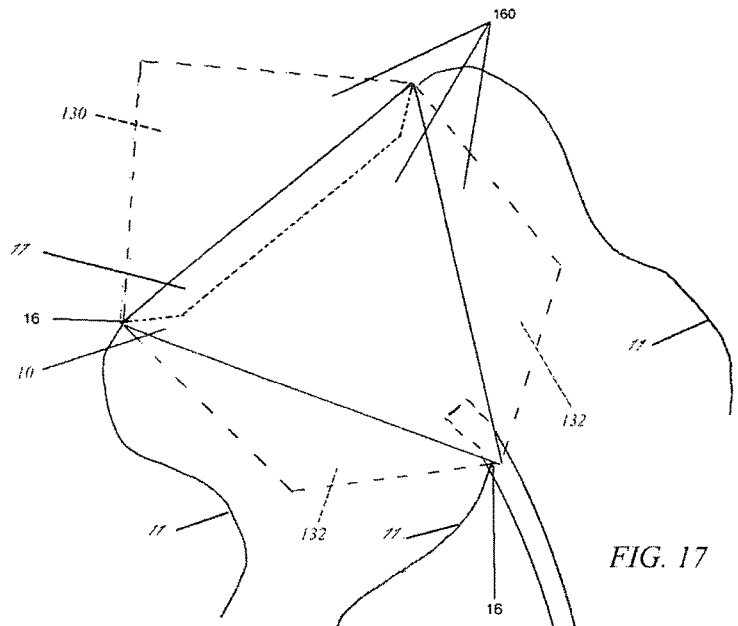
FIG. 17 is a plan view of a kite coversheet construction with enclosed tethers and an aerodynamic device (a tail) attached thereto.
Figure 16:
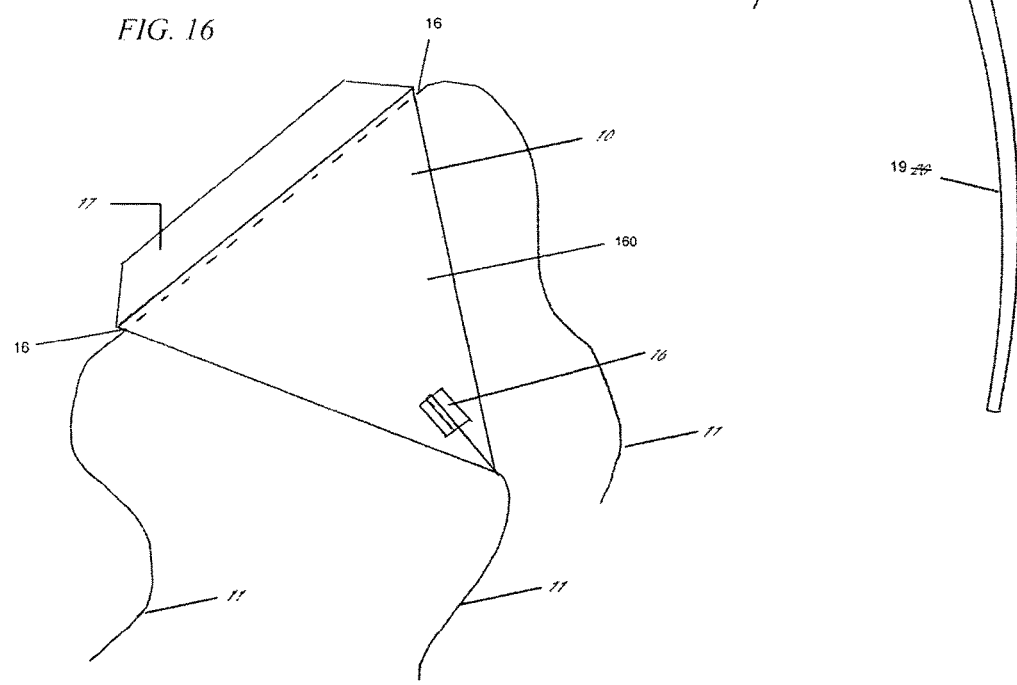
FIG. 16 is a plan view of a kite coversheet construction with folding appendage and tethers attachable within the foldable cover sheet.

Kites 10 in both two and three dimensional designs may also have one coversheet (160 in FIG. 16) or more than one coversheet (160 in FIG. 17). The kites of FIGS. 18(*c*) and 18(*d*), for example, were made in three dimensional form by folding two cover sheets 160 in FIGS. 18(*a*) and 18(*b*). An additional coversheet or sheets 160 may also be laminated for added structural strength as well as for additional lifting (130) or additional stabilizing (132) surfaces or a combination thereof depending on the kites design and flying requirements (FIG. 17). The folding appendage 17 of the coversheet (160 in FIG. 16) may be of various shapes, sizes and number and these requirements would depend on the desired kite design. The appendage or appendages 17 may be folded or refolded to provide the extra structural support usually provided by a separate frame. This over lapping and bonding of the folded appendages 17 may also be used for added structural strength and to give the kite 10 its three-dimensional form (for example FIGS. 18(*a*), 18(*b*) and 18(*c*)). Other lightweight three-dimensional support structures (such as 170 in FIGS. 18(*d*), 18(*e*), 18(*f*) and 18(*g*)) and/or further coversheets may be added to the kite 10. If further support is needed in the folded appendage or other locations a planar supporting structure (for example 154 in FIG. 19) may be used. This would depend on materials used and the kite's design requirements. Within the folded appendage 17 the tether 11 may be secured and held. The tethers 11 may be secured within the folded appendage 17 and extend from the folded appendage 17 in the desired location and given the desired length (FIGS. 16-18).

{Inner Core}

In the case of a three-dimensional kite 10, such as one derived from a box-kite, triangular kite or cylindrical/conical kite, an inner support structure may be necessary to help retain the desired shape. This would be achieved by using a modified coversheet that becomes an inner core 165 for extra structural strength (as in FIGS. 18(*a*), 18(*b*) and 18(*c*)). This inner core 165 may also be designed with folding and overlapping appendages 17 for added strength. Additional supporting structures (170 and 154) may be added if needed. Various three-dimensionally shaped support structures 170 (such as squares, rectangles {for example FIGS. 18(*d*) through (*g*)}, triangles, circles, ovals, or tubing or a combination thereof) may be used to help support and maintain the desired shape of the kite 10. These additional supporting structures 170 may be made from lightweight materials such as paper, plastic, oaktag, styrofoam or a combination of lightweight materials.

FIG. 18(*a*) shows one half of an inner core 165 and cover sheet 160 with folding appendages 17 and tethers 11 secured between the cover sheet 160 and the inner core 165. FIG. 18(*b*) shows the second half of the inner core 165 and cover sheet 160 with coordinated folding appendages 17 that overlap and bond to the folded appendage 17 of coversheet 160 in FIG. 18(a), thus creating the three dimensional kite 10 with an inner core 165 as shown in the example FIG. 18(c).

Figure 18A:
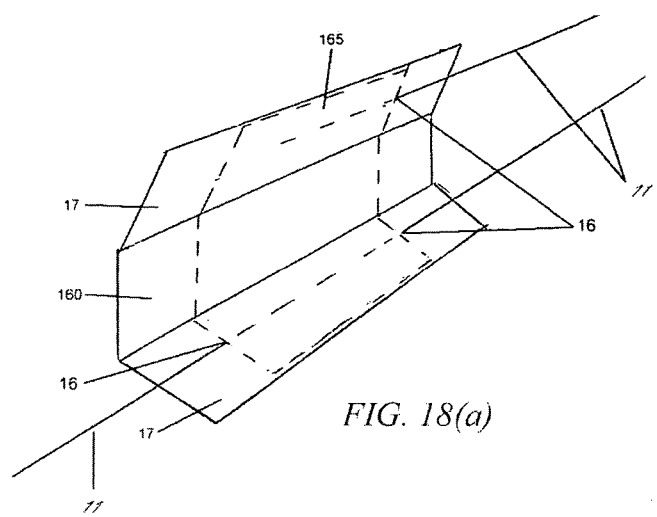
FIGS. 18(*a*) through 18(*g*) are perspective views of the construction of reinforcing inner cores and structural supports for three dimensional kites.
Figure 18B:
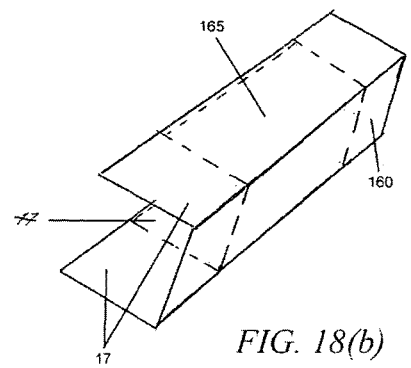
Figure 18C:
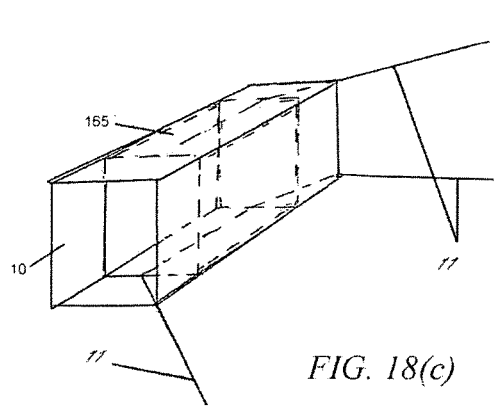
Figure 18D:
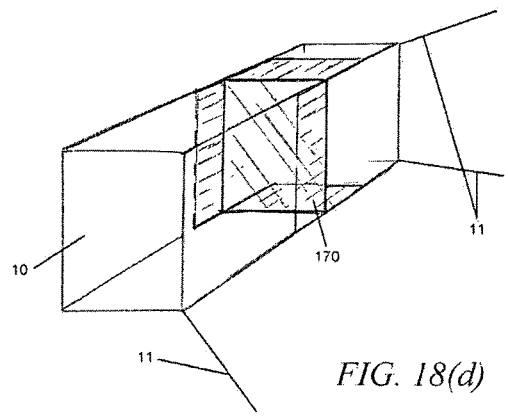
Figure 18E:
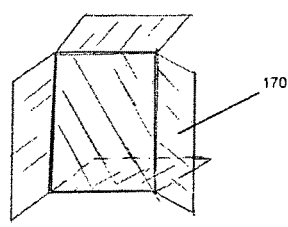
Figure 18F:
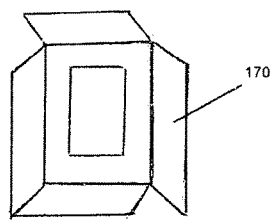
Figure 18G:
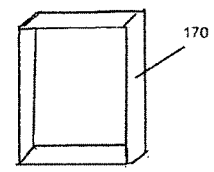

FIG. 18(d) shows an alternative supporting structure 170 for strengthening the coversheet 160 of a three dimensional kite 10, which may also be used in conjunction with the method of FIG. 18(c). FIG. 18(e) shows the supporting structure 170 used in FIG. 18(d), and other examples of three-dimensional supporting structures 170 are shown as FIGS. 18(f) and 18(g).

The construction design requirements would greatly depend on the weight and strength of the construction material as well as the size and design of the kite 10. Some of these kites 10 may be designed to fold for easier storage or mailing. Many uniquely lovely kites may be designed by using these construction methods.

{Second Construction Style}

Figure 19:
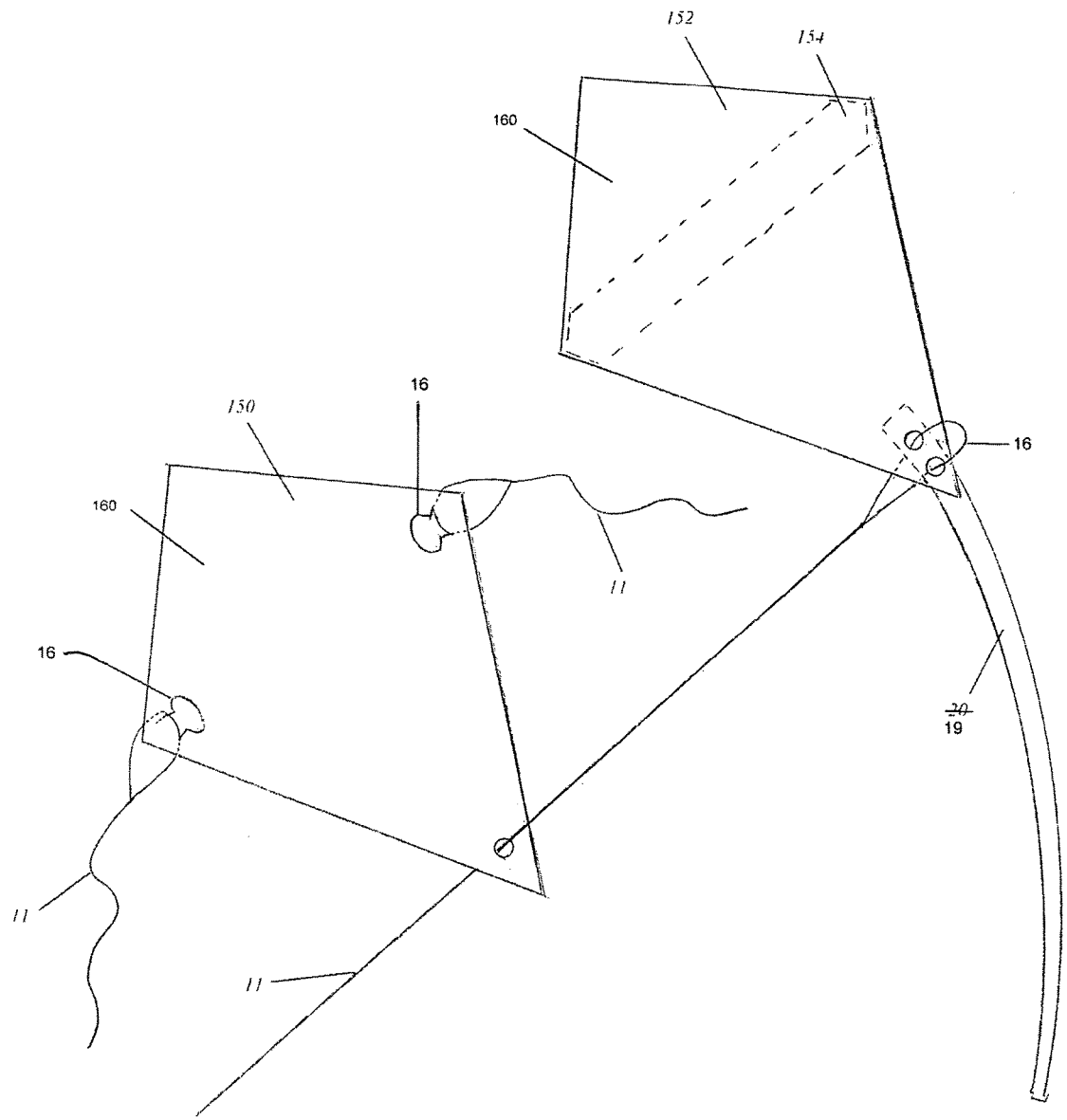
FIG. 19 is a partial perspective view of a method of constructing a kite from laminated materials.
Figure 20A:
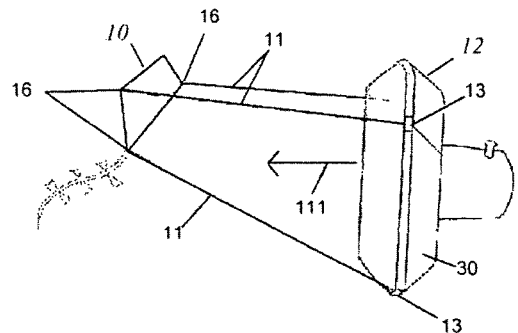
FIG. 20(*a*) is a partial perspective view of a symmetrical kite flying tethered to a generic fan housing.
Figure 20B:
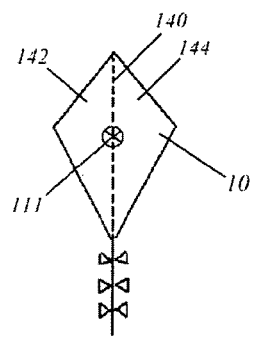
Figure 20C:
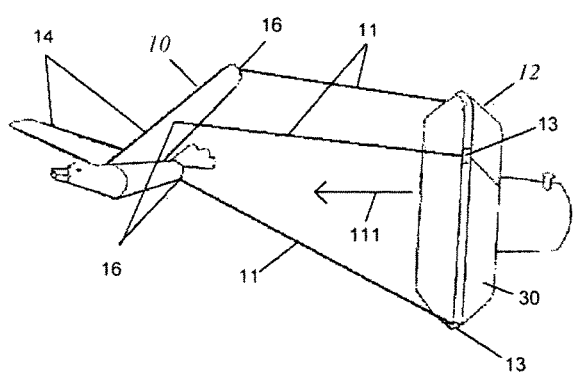
Figure 20D:
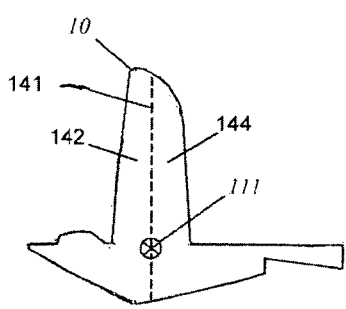

A second construction style laminates different materials, for example a lightweight clear or translucent material that is stiff yet flexible (150 in FIG. 19). This material is cut to the desired design requirements and a lightweight coversheet 160 (such as ripstop nylon 152) applied to the front surface and, if required, to the back as well, or various coversheet materials may be laminated together (160 in FIG. 19). Tabs (such as 156 in FIG. 19) may be used as attachment devices to removably attach the tethers to the kite. Additional support structures (such as 154 in FIGS. 19 and 170 in FIGS. 18(f) and 18(g)) may be applied to strengthen the kite. Alternatively the design is printed directly onto the stiff yet flexible material. These construction methods greatly reduce manufacturing and assembly time and greatly reduce cost of construction for both two dimensional and three dimensional kites.

{Third Construction Style}

A third construction style may use a more supportive construction, as well as a more traditional kite frame, that is separate from the coversheet and may be used for a kite 10 being flown from a much larger fan or wind source 12 as well as for outdoor use.

Let it be understood that a kite 10 may be constructed in a wide variety of ways and with a wide variety of materials and is not limited to these construction techniques. The construction of any particular kite 10 will greatly depend on its size, the materials used, the intended purpose of use, as well as the size and airflow velocity 100 of the fan 12 to be used. A fan 12 of any size, and most fans with a fan housing 30, generating sufficient airflow 100 may be used to fly the correctly sized kite 10 having an appropriate number and placement of tethers 11 and removable or permanent means of attachment, such as devices 13.

While the above descriptions contain much specificity, this specificity should not be construed as limiting the scope of the invention, but rather as an exemplification of the invention. The invention includes (i) a method for flying a kite from a wind source, (ii) a kite flying assembly, and (iii) a kite device, which permit the kite to achieve generally stable, controlled and sustainable flight in the airflow from a wind source such as a fan.

From the foregoing, it will be observed that numerous variations and modifications of the underlying inventive subject matter will readily suggest themselves to those skilled in the art and which are encompassed within the spirit of the invention. Thus, it is to be understood that no limitation with respect to the specific assembly, construction or methodology disclosed herein is intended or should be inferred. It is intended to cover by the appended claims all such modifications as fall within the scope of the claims.

I claim:

1. A kite flying assembly comprising,
a kite, the kite being a three-dimensional (3-D) kite, the kite being constructed primarily out of lightweight materials, the kite having a plurality of kite-to-tether attachment points, there being no plane that divides a combination of the shape of the kite and the location of the kite-to-tether attachment points into two parts that are mirror images of each other,
a wind source, having a plurality of tether-to-wind source attachment points, the wind source generating an airflow capable of elevating the kite within a lifting zone, the airflow exiting from a housing of the wind source in a direction that remains generally constant relative to the wind source housing,
a plurality of tethers, made of lightweight and flexible material, two or more tethers extending intermediate the kite-to-tether and tether-to-wind source attachment points, tethers being cooperatively attached to the kite at kite-to-tether attachment points and cooperatively attached to the wind source at tether-to-wind source attachment points,
wherein the tethers are of a length that permits flight of the kite while constraining the position of the kite in the airflow, the kite-to-tether attachment points and the tether-to-wind source attachment points are located so as to balance and angle the kite in the airflow, the locations of the kite-to-tether attachment points determine the orientation of the kite in the airflow such that the kite presents an asymmetrical shape to the airflow and the kite flies asymmetrically,
whereby the airflow generates aerodynamic forces on the kite and tensile forces in the tethers, such that the tensile forces in the tethers generally counter-balance the aerodynamic and gravitational forces on the kite, thereby achieving generally stable, controlled and sustainable flight of the tethered kite from the wind source.

2. The kite flying assembly of claim 1 wherein one or more of the plurality of tethers have tether overhang, tether overhang being excess tether that extends beyond the tether-to-wind source attachment point for adjusting tether length, the tether overhang being located outside the airflow.

3. The kite flying assembly of claim 2 wherein the tether overhang has one or more safety devices, at least one of the one or more safety devices is/are objects of sufficient size or weight or a combination thereof to prevent entanglement of the tether overhang in moving parts of the wind source.

4. The kite flying assembly of claim 3 wherein at least one of the one or more safety devices has/have a bridle for balance.

5. The kite flying assembly of claim 3 wherein at least one of the one or more safety devices is/are in the form of a mobile .

6. The kite flying assembly of claim 2 wherein the tether overhang is releasably secured to the wind source via one or more safety devices, the one or more safety devices being objects that prevent entanglement in the moving parts of the wind source, at least one of the one or more safety devices being adhesive on one side and removably attaching the tether overhang to the wind source.

7. The kite flying assembly of claim 1 wherein one or more of the plurality of tethers is/are releasable from the tether-to-wind source attachment point enabling the kite to be flown manually.

8. The kite flying assembly of claim 1 wherein one or more of the plurality of tethers removably attach to the wind source or removably attach to the kite or a combination thereof.

9. The kite flying assembly of claim 1 wherein an attachment device removably attaches to the wind source and removably attaches to at least one of the plurality of tethers and removably attaches at least one of the plurality of tethers to the wind source thus facilitating adjustment of tether length or tether location on the wind source or a combination thereof.

10. The kite flying assembly of claim 1 wherein, after the kite achieves generally stable flight, the wind source is capable of being moved, wherein the tensile forces in the tethers generally counter-balance the additional forces on the kite in the event of movement so that the flight of the kite remains generally stable.

11. The kite flying assembly of claim 1 wherein the kite is initially at rest substantially within the lifting zone of the airflow, the kite tethered for generally stable flight, whereby the kite self-launches upon activation of the airflow.

12. The kite flying assembly of claim 1 wherein one or more aerodynamic devices are removably attached to the kite to give the kite additional balance or lift or a combination thereof.

13. The kite flying assembly of claim 12 wherein the one or more aerodynamic devices include messages, or images, or logos, or commercial advertising or a combination thereof.

14. The kite flying assembly of claim 1 wherein one or more scenic embellishments are added to the wind source to provide the perception of depth and the illusion of free flight.

15. The kite flying assembly of claim 1 wherein the wind source housing and the airflow are capable of being repositioned about an axis of rotation, and the two or more tethers are attached to the wind source housing, wherein the kite remains in generally stable flight within the airflow and rotates with the airflow in the event of repositioning.

16. The kite flying assembly of claim 1 wherein the wind source housing is capable of oscillating about an axis of rotation and the two or more tethers are attached to the wind source housing, wherein the kite remains in generally stable flight within the airflow and oscillates with the airflow in the event of oscillation.

17. The kite flying assembly of claim 1 wherein the kite is capable of being repositioned by adjusting the length of one or more of the plurality of tethers or adjusting the positions of one or more tether-to-wind source attachment points or adjusting the positions of one or more kite-to-tether attachment points or a combination thereof.

18. The kite flying assembly of claim 1 wherein the kite has one or more bridles attached to at least one of the plurality of tethers.

19. The assembly of claim 1 wherein the kite has an inherent longitudinal axis that extends from a front end to a back end of the kite, the kite-to-tether attachment points are located such that during flight the longitudinal axis of the tethered kite is oriented at an angle substantially away from parallel to the airflow, whereby the kite flies generally sideways and generally heading across the airflow, thus the shape of the kite presented to the airflow is asymmetric.

20. The assembly of claim 19 wherein the shape of the kite excluding the location of the kite-to-tether attachment points is generally symmetrical.

21. The kite flying assembly of claim 19 wherein the kite has one or more pairs of wings oppositely disposed across the longitudinal axis.

22. The kite flying assembly of claim 21 wherein the one or more wings on one side of the longitudinal axis have one or more kite-to-tether attachment points and the one or more wings on the opposite side of the longitudinal axis have no kite-to-tether attachment points, thus the combination of the kite and the kite-to-tether attachment points is asymmetrical in structure.

23. The kite flying assembly of claim 22 wherein one or more additional kite-to-tether attachment points are at locations other than on the wings.

24. The kite flying assembly of claim 21 wherein the one or more pair of wings have dihedral or polyhedral or a combination thereof.

25. The kite flying assembly of claim 1 wherein at least one additional kite is tethered to the wind source and positioned in the airflow for simultaneous flight.

26. The kite flying assembly of claim 1 wherein the kite is connected to, or interconnected with, at least one additional kite, or via combination of such connections, and the kites are tethered to the wind source and positioned in the airflow for simultaneous flight.

27. A kite device comprising:
a kite, the kite being constructed primarily out of lightweight materials, the kite capable of elevation in response to airflow thereagainst from a wind source, the wind source having a plurality of tether-to-wind source attachment points, the kite having a plurality of kite-to-tether attachment points,
a plurality of tethers, the tethers made of lightweight and flexible material, two or more tethers capable of extending intermediate the kite-to-tether and the tether-to-wind source attachment points, the tethers being attached to the kite at the kite-to-tether attachment points and capable of being attached to the wind source at the tether-to-wind source attachment points, the two or more tethers having tether overhang, the tether overhang being excess tether that extends beyond the tether-to-wind source attachment point so as to facilitate manual adjustment of individual tether lengths during flight, the tether overhang to be located outside the airflow when the kite is in flight, and
one or more safety devices, the one or more safety devices being objects that prevent entanglement of the tether overhang in moving parts of the wind source, the one or more safety devices being attached to the tether overhang,
wherein the tethers are of a length that permits flight of the kite while capable of constraining the position of the kite within a lifting zone of the airflow, the kite-to-tether attachment points and the tether-to-wind source attachment points are located where the kite is capable of being balanced and angled in the airflow,
whereby the airflow generates aerodynamic forces on the kite and tensile forces in the tethers, such that the tensile forces in the tethers generally counter-balance the aerodynamic and gravitational forces on the kite, thereby achieving generally stable, controlled and sustainable flight of the tethered kite from the wind source.

28. The kite device of claim 27 wherein the kite is repositionable by adjusting the length of one or more of the plurality of tethers via the tether overhang, or the positions of one or more tether-to-wind source attachment points, or the positions of one or more kite-to-tether attachment points, or a combination thereof.

29. The kite device of claim 27 wherein at least one of the one or more safety devices has/have sufficient size or weight or a combination thereof to prevent entanglement of the tether overhang in moving parts of the wind source.

30. The kite device of claim 27 wherein at least one of the one or more safety devices is/are removably attached to the tether overhang.

31. The kite device of claim 27 wherein one or more of the plurality of tethers is/are removably attached to the kite or capable of being removably attached to the wind source or a combination thereof.

32. The kite device of claim 27 wherein an attachment device is capable of removably attaching to the wind source and removably attaching to at least one of the plurality of tethers and removably attaching at least one of the plurality of tethers to the wind source thus facilitating adjustment of tether length or tether location on the wind source or a combination thereof.

33. The kite device of claim 27 wherein one or more aerodynamic devices are removably attached to the kite to give it additional balance or lift or a combination thereof.

34. The kite device of claim 33 wherein the one or more aerodynamic devices include messages, or images, or logos, or commercial advertising or a combination thereof.

35. The kite device of claim 27 wherein the kite has one or more bridles attached to at least one of the plurality of tethers.

36. The kite device of claim 27 wherein one or more of the plurality of tethers is/are marked to indicate where the tether is initially to be removably attached to the wind source.

37. The kite device of claim 27 wherein the shape of the kite and the location of the kite-to-tether attachment points are generally symmetrical.

38. The kite device of claim 27 wherein the kite is asymmetrical, there being no plane that divides a combination of the shape of the kite and the location of the kite-to-tether attachment points into two parts that are mirror images of each other.

39. The kite device of claim 27 wherein the kite is three-dimensional.

40. The kite device of claim 27 wherein the kite has an inherent longitudinal axis that extends from a front end to a back end of the kite, the kite-to-tether attachment points are located such that during flight the longitudinal axis of the tethered kite is oriented at an angle substantially away from parallel to the airflow, whereby the kite flies generally sideways and generally heading across the airflow, thus the shape of the kite presented to the airflow is asymmetric.

41. The kite device of claim 27 wherein the kite has one or more pairs of wings.

42. The kite device of claim 41 wherein the one or more pair of wings have dihedral or polyhedral or a combination thereof.

43. The kite device of claim 27 wherein at least one of the one or more safety devices is/are adhesive on one side and removably attaches the tether overhang to the wind source.

44. The kite device of claim 27 wherein one or more of the plurality of tethers is/are adjustable when the kite is at rest.

45. A kite flying assembly comprising,
a kite, the kite constructed primarily of lightweight materials, the kite having a plurality of kite-to-tether attachment points,
a wind source, the wind source having a plurality of tether-to-wind source attachment points, the wind source generating an airflow capable of elevating the kite within a lifting zone, the airflow exiting from a housing of the wind source in a direction that remains generally constant relative to the wind source housing,
a plurality of tethers, the tethers made of lightweight and flexible material, two or more tethers extending intermediate the kite-to-tether and the tether-to-wind source attachment points, the tethers being attached to the kite at the kite-to-tether attachment points and attached to the wind source at the tether-to-wind source attachment points, the tethers having tether overhang, the tether overhang being excess tether that extends beyond the tether-to-wind source attachment point so as to facilitate adjustment of tether length, the tether overhang being located outside the airflow during flight, and
one or more safety devices, the one or more safety devices being objects that prevent entanglement of the tether overhang in moving parts of the wind source, the one or more safety devices being attached to the tether overhang,
wherein the tethers are of a length that permits flight of the kite while constraining the position of the kite in the airflow, the kite-to-tether attachment points and the tether-to-wind source attachment points located so as to balance and angle the kite in the airflow,
whereby the airflow generates aerodynamic forces on the kite and tensile forces in the tethers, such that the tensile forces in the tethers generally counter-balance the aerodynamic and gravitational forces on the kite, thereby achieving generally stable, controlled and sustainable flight of the tethered kite from the wind source.

46. The kite flying assembly of claim 45 wherein the kite is positioned by adjusting the length of one or more of the plurality of tethers via the tether overhang or adjusting the positions of one or more tether-to-wind source attachment points or adjusting the positions of one or more kite-to-tether attachment points or a combination thereof.

47. The kite flying assembly of claim 45 wherein the shape of the kite and the location of the kite-to-tether attachment points are generally symmetrical.

48. The kite flying assembly of claim 45 wherein the kite is asymmetrical in shape.

49. The kite flying assembly of claim 45 wherein the kite is three-dimensional in shape.

50. The kite flying assembly of claim 45 wherein at least one of the one or more safety devices is/are removably attached to the tether overhang.

51. The kite flying assembly of claim 45 wherein an attachment device removably attaches to the wind source and removably attaches to at least one of the plurality of tethers and removably attaches at least one of the plurality of tethers to the wind source thus facilitating adjustment of tether length or tether location on the wind source or a combination thereof.

52. The kite flying assembly of claim 45 wherein at least one of the one or more safety device(s) is/are adhesive on one side and removably attaches the tether overhang to the wind source.

53. The kite flying assembly of claim 45 wherein the wind source housing and the airflow are capable of being repositioned about an axis of rotation, and the two or more tethers are attached to the wind source housing, wherein the kite rotates with the airflow, remaining in generally stable flight in the event of repositioning.

54. The kite flying assembly of claim 45 wherein the wind source housing is capable of oscillating about an axis of rotation and the two or more tethers are attached to the wind source housing, wherein the kite oscillates with the airflow, remaining in generally stable flight in the event of oscillation.

55. The kite flying assembly of claim 45 wherein at least one of the one or more safety devices has/have sufficient size or weight or a combination thereof to prevent entanglement of the tether overhang in moving parts of the wind source.

56. The kite flying assembly of claim 45 wherein the kite has one or more bridles attached to at least one of the plurality of tethers.

57. The kite flying assembly of claim 45 wherein one or more aerodynamic devices are removably attached to the kite to give the kite additional balance or lift or a combination thereof.

58. The kite flying assembly of claim 57 wherein the one or more aerodynamic devices include messages, or images, or logos, or commercial advertising or a combination thereof.

59. The kite flying assembly of claim 45 wherein one or more of the plurality of tethers is/are releasable from the tether-to-wind source attachment point enabling the kite to be flown manually.

60. The kite flying assembly of claim 45 wherein the kite is initially at rest substantially within the lifting zone of the airflow, the kite tethered for generally stable flight, whereby the kite self-launches upon activation of the airflow.

61. The kite flying assembly of claim 45 wherein at least one additional kite is tethered to the wind source and positioned in the airflow for simultaneous flight.

62. The kite flying assembly of claim 45 wherein the kite is connected to, or interconnected with, at least one additional kite, or via a combination of such connections, and the kites are tethered to the wind source and positioned in the airflow for simultaneous flight.

* * * * *